United States Patent
Shudarek

(10) Patent No.: US 9,613,745 B2
(45) Date of Patent: Apr. 4, 2017

(54) ADJUSTABLE INTEGRATED COMBINED COMMON MODE AND DIFFERENTIAL MODE THREE PHASE INDUCTORS AND METHODS OF MANUFACTURE AND USE THEREOF

(71) Applicant: MTE Corporation, Menomonee Falls, WI (US)

(72) Inventor: Todd Shudarek, West Bend, WI (US)

(73) Assignee: MTE Corporation, Menomonee Falls, WI (US)

( * ) Notice: Subject to any disclaimer, the term of this patent is extended or adjusted under 35 U.S.C. 154(b) by 234 days.

(21) Appl. No.: 14/513,056

(22) Filed: Oct. 13, 2014

(65) Prior Publication Data

US 2015/0102882 A1    Apr. 16, 2015

Related U.S. Application Data

(60) Provisional application No. 61/889,953, filed on Oct. 11, 2013, provisional application No. 61/890,003, (Continued)

(51) Int. Cl.
*H01F 30/14* (2006.01)
*H01F 27/24* (2006.01)
(Continued)

(52) U.S. Cl.
CPC .............. *H01F 37/00* (2013.01); *H01F 3/14* (2013.01); *H02M 1/126* (2013.01)

(58) Field of Classification Search
CPC .... H01F 30/12; H01F 3/14; H01F 2017/0093; H02M 1/126; H02M 7/003; H02M 2001/0064
(Continued)

(56) References Cited

U.S. PATENT DOCUMENTS 2,702,887 A    2/1955  Joublanc
7,142,081 B1*  11/2006 Shudarek ................ H01F 27/24
                                                    336/178
(Continued)

OTHER PUBLICATIONS

International Search Report and Written Opinion from International Application No. PCT/US2014/060296 dated Jan. 29, 2015.

*Primary Examiner* — Alexander Talpalatski
*Assistant Examiner* — Joselito Baisa
(74) *Attorney, Agent, or Firm* — Greenberg Traurig, LLP

(57) ABSTRACT

In some embodiments, the instant invention can provide an electrical system that at least includes the following: a three-phase inductor, having: a core, having: at least one first core segment, having a first shape; at least one second core segment, having a second shape; at least one third core segment, having a third shape; where the at least one first core segment, the at least one second core segment, and the at least one third core segment are configured to be: separate from each other and adjustable relative to each other; and where the core is configured so that differential mode inductance flux paths during the operation of the three-phase inductor depend on the first shape of the at least one first core segment, the second shape of the at least one second core segment, and the third shape of the at least one third core segment.

18 Claims, 30 Drawing Sheets

Related U.S. Application Data filed on Oct. 11, 2013, provisional application No. 61/909,652, filed on Nov. 27, 2013, provisional application No. 61/909,680, filed on Nov. 27, 2013.

(51) Int. Cl.
*H01F 17/04* (2006.01)
*H01F 17/00* (2006.01)
*H01F 38/38* (2006.01)
*H01F 37/00* (2006.01)
*H01F 3/14* (2006.01)
*H02M 1/12* (2006.01)

(58) Field of Classification Search
USPC .......... 336/10, 212, 221; 323/355, 363, 361; 333/12
See application file for complete search history.

(56) References Cited

U.S. PATENT DOCUMENTS

| | | | | |
|---|---|---|---|---|
| 7,449,799 B2* | 11/2008 | Levin | ............... | H02J 3/01 307/105 |
| 7,768,373 B2* | 8/2010 | Shudarek | ............... | H01F 3/10 336/212 |
| 7,902,956 B2* | 3/2011 | Sodo | ............... | H01F 37/00 336/229 |
| 8,502,631 B2 | 8/2013 | Cavender et al. | | |
| 8,653,931 B2* | 2/2014 | Xu | ............... | H02P 9/02 336/234 |
| 8,698,584 B2* | 4/2014 | Pietkiewicz | ............... | H02M 1/126 336/12 |
| 8,890,642 B2* | 11/2014 | Pietkiewicz | ............... | H02M 1/126 336/15 |
| 2005/0030140 A1* | 2/2005 | Dahlgren | ............... | H01F 27/255 336/5 |
| 2005/0258705 A1* | 11/2005 | Berwald | ............... | B23C 3/00 310/216.042 |
| 2006/0250207 A1* | 11/2006 | Shudarek | ............... | H01F 27/24 336/212 |
| 2008/0074227 A1 | 3/2008 | Chen et al. | | |
| 2008/0094159 A1* | 4/2008 | Sodo | ............... | H02M 1/126 336/5 |
| 2009/0140829 A1* | 6/2009 | Sodo | ............... | H01F 37/00 336/5 |
| 2009/0261939 A1* | 10/2009 | Shudarek | ............... | H01F 3/10 336/212 |
| 2012/0106210 A1 | 5/2012 | Xu et al. | | |

* cited by examiner

ADJUSTABLE INTEGRATED COMBINED COMMON MODE AND DIFFERENTIAL MODE THREE PHASE INDUCTORS AND METHODS OF MANUFACTURE AND USE THEREOF

RELATED APPLICATIONS

This application claims priority of U.S. provisional application Ser. No. 61/889,953, entitled "ADJUSTABLE INTEGRATED COMBINED COMMON MODE AND DIFFERENTIAL MODE THREE PHASE INDUCTORS AND METHODS OF MANUFACTURE AND USE THEREOF", filed on Oct. 11, 2013; U.S. provisional application Ser. No. 61/890,003, entitled "ADJUSTABLE INTEGRATED COMBINED COMMON MODE AND DIFFERENTIAL MODE THREE PHASE INDUCTORS AND METHODS OF MANUFACTURE AND USE THEREOF", filed on Oct. 11, 2013; U.S. provisional application Ser. No. 61/909,652, entitled "ADJUSTABLE INTEGRATED COMBINED COMMON MODE AND DIFFERENTIAL MODE THREE PHASE INDUCTORS AND METHODS OF MANUFACTURE AND USE THEREOF", filed on Nov. 27, 2013; and U.S. provisional application Ser. No. 61/909,680, entitled "ADJUSTABLE INTEGRATED COMBINED COMMON MODE AND DIFFERENTIAL MODE THREE PHASE INDUCTORS AND METHODS OF MANUFACTURE AND USE THEREOF", filed Nov. 27, 2013, which are incorporated herein by reference in their entirety for all purposes.

TECHNICAL FIELD

In some embodiments, the instant invention relates to three phase inductors and methods of manufacture and use thereof.

BACKGROUND

Typically, a three phase inductor has both common mode and differential mode magnetic flux paths that overlap and circulate around the center of the core construction. Typically, a three phase inductor is constructed from three core segments.

SUMMARY OF INVENTION

In some embodiments, the instant invention can provide an electrical system that at least includes the following: at least one three-phase inductor, having: at least one core, having: at least one first core segment, having a first shape; at least one second core segment, having a second shape; at least one third core segment, having a third shape; where the at least one first core segment, the at least one second core segment, and the at least one third core segment are configured to be: i) separate from each other and ii) adjustable relative to each other; a plurality of common mode gaps; where the plurality of common mode gaps are configured to separate the at least one first core segment, the at least one second core segment, and the at least one third core segment from each other; a plurality of differential mode gaps; where the plurality of differential mode gaps are configured to separate the at least one first core segment, the at least one second core segment, and the at least one third core segment from each other; where the at least one core is configured so that differential mode inductance flux paths during the operation of the at least one three-phase inductor depend on the first shape of the at least one first core segment, the second shape of the at least one second core segment, and the third shape of the at least one third core segment; where the at least one core is configured such that thickness of each common mode gap is capable of being independently adjusted from thicknesses of other common mode gaps of the plurality of common mode gaps to result in a particular common mode inductance; and where the at least one core is configured such that thickness of each differential mode gap is capable of being independently adjusted from: i) thicknesses of other differential mode gaps of the plurality of differential mode gaps and ii) the thicknesses of other common mode gaps of the plurality of common mode gaps, to result in a particular differential mode inductance.

In some embodiments, the first shape of the at least one first core segment, the second shape of the at least one second core segment, and the third shape of the at least one third core segment are the same.

In some embodiments, the particular common mode inductance is determined based on: i) core material from which the at least one core is made, ii) a size of the at least one core, iii) a number of coil turns, and iv) thicknesses of the plurality of common mode gaps.

In some embodiments, the particular differential mode inductance is determined based on: i) core material from which the at least one core is made, ii) a size of the at least one core, iii) a number of coil turns, and iv) thicknesses of at least one common mode gap and thicknesses of at least one differential mode gap being traversed by a differential mode inductance flux path associated with the particular differential mode inductance.

In some embodiments, the core material is selected from the group consisting of powered iron, molypermalloy, ferrite, steel laminations, and sendust.

In some embodiments, the thickness of each of the plurality of common mode gaps varies from 0.005 to 1.5 inches. In some embodiments, the thickness of each of the plurality of common mode gaps varies from 0.005 to 0.25 inches. In some embodiments, the thickness of each of the plurality of differential mode gaps varies from 0.005 to 1.5 inches. In some embodiments, the thickness of each of the plurality of differential mode gaps varies from 0.005 to 0.25 inches.

In some embodiments, the at least one core is configured such that a first longitudinal axis of a particular differential mode gap associated with a particular core segment is being positioned at an angle of 90 degrees to a second longitudinal axis of a particular common mode gap associated with the particular core segment.

In some embodiments, each of the plurality of common mode gaps is filed with at least one of: air, Nomex, a fiberglass-reinforced thermoset polyester, or any combination thereof. In some embodiments, each of the plurality of differential mode gaps is filed with at least one of: air, Nomex, a fiberglass-reinforced thermoset polyester, or any combination thereof. In some embodiments, the at least one first core segment, the at least one second core segment, and the at least one third core segment are held together in the at least one core by at least one flexible securing mechanism. In some embodiments, the at least one three-phase inductor further includes: at least one first coil bobbin being around the at least one first core segment, at least one second coil bobbin being around the at least one second core segment, at least one third coil bobbin being around the at least one third core segment; and where the at least one first coil bobbin, the at least one second coil bobbin, and the at least one third coil bobbin are configured to be independently manufactured from the at least one first core segment, the at least one second core segment, and the at least one third core segment, respectfully.

In some embodiments, the at least one three-phase inductor is a Root-Mean-Square current rating inductor. In some embodiments, the electrical system is a Sinewave filter. In some embodiments, the electrical system is a harmonic mitigating filter.

In some embodiments, the instant invention can provide an electrical system that at least includes the following: at least one three-phase inductor, having: at least one core, having: at least one first core segment, having a first shape; at least one second core segment, having a second shape; at least one third core segment, having a third shape; where the at least one first core segment, the at least one second core segment, and the at least one third core segment are configured to be: i) separate from each other and ii) adjustable relative to each other; and where the at least one core is configured so that differential mode inductance flux paths during the operation of the at least one three-phase inductor depend on the first shape of the at least one first core segment, the second shape of the at least one second core segment, and the third shape of the at least one third core segment.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
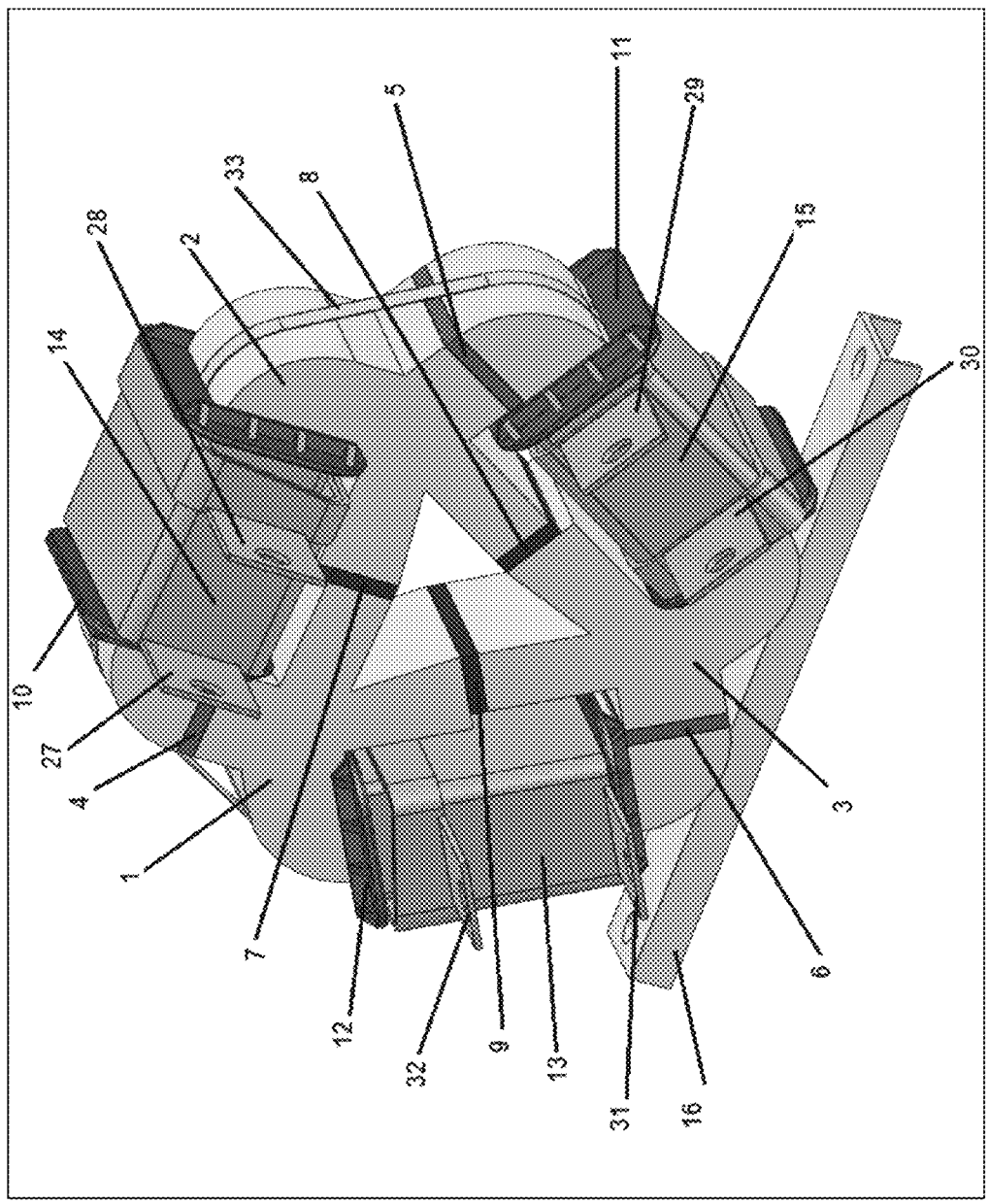
FIGS. 1-30 are snapshots that illustrate certain aspects of the instant invention in accordance with some embodiments of the instant invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Further, the terms "substantial," "substantially," "similar," "similarly," "analogous", "analogously," and any combination thereof mean that differences between compared features or characteristics is less than 25% of the respective values/magnitudes in which the compared features or characteristics are measured and/or defined.

In some embodiments of the instant invention, once the core pieces and coils are manufactured, the common mode and differential mode inductances can be independently tuned by adjusting gaps between three core segments. While the present description describes various types of the inventive inductors but should not be limited to such described types.

Figure 2:
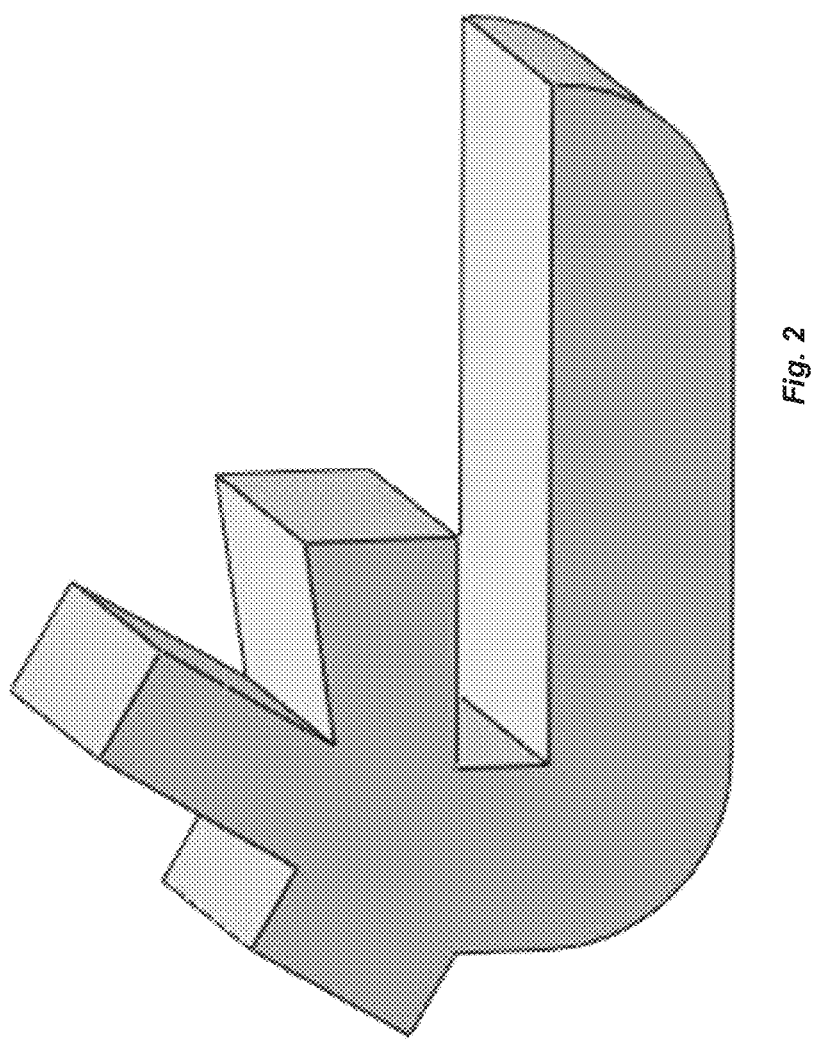
Figure 3:
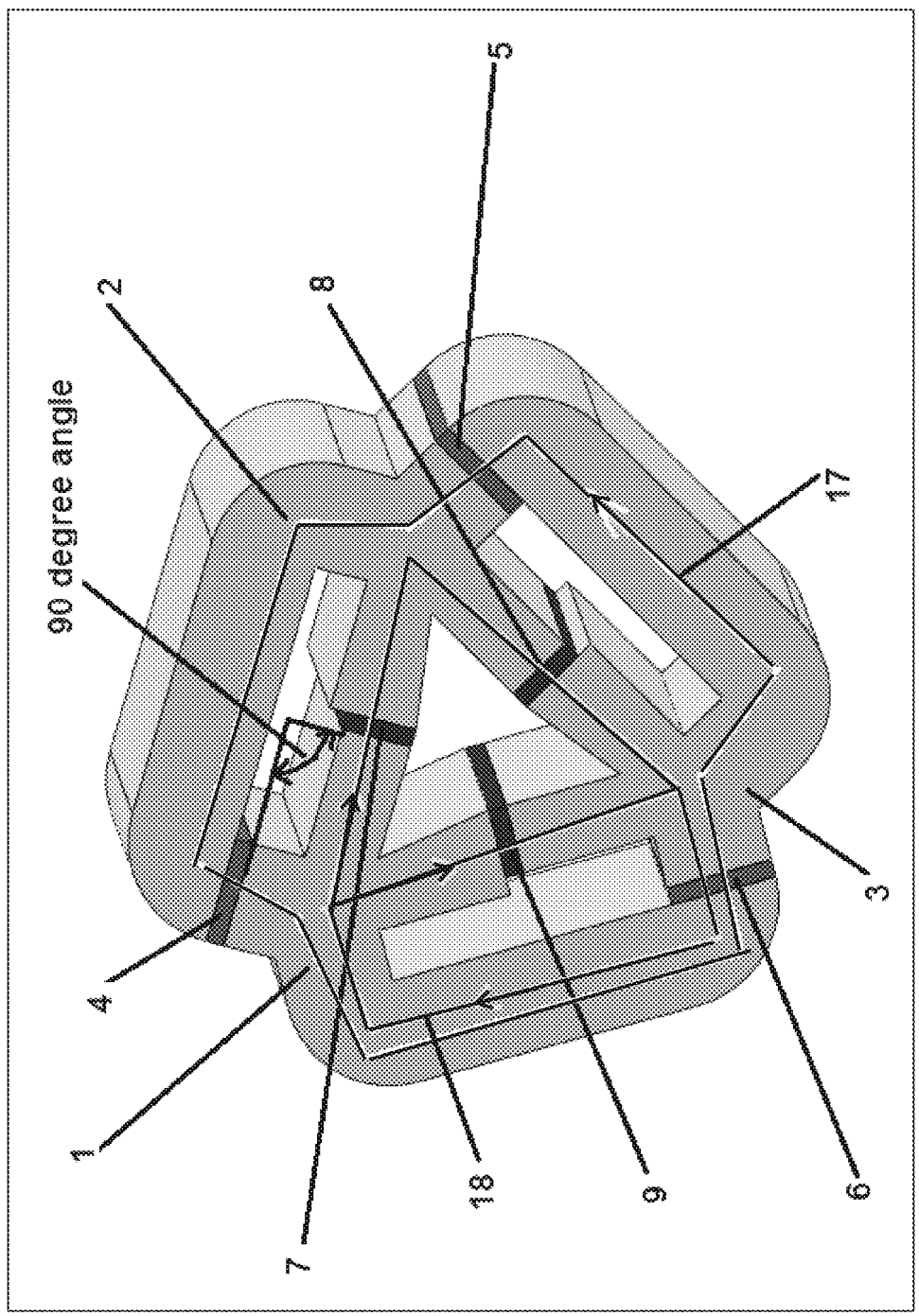

Illustrative Type I Inventive Inductors in Accordance with Some Embodiments of the Instant Invention FIG. 1 shows a snapshot of an exemplary construction of type I inventive inductors in accordance with some embodiments of the instant invention. In some embodiments of the instant invention, an exemplary core is constructed from three pieces/segments (1, 2, 3) that are made from core materials such as powered iron, molypermalloy, ferrite, steel laminations, sendust, or from any other similarly suitable material, or any combination thereof. In some embodiments, an exemplary individual core piece, in accordance with some embodiments of the instant invention, is shown in FIG. 2. FIG. 3 shows a more detailed view of the core structure with the three core pieces in accordance with some embodiments of the instant invention.

In some embodiments of the instant invention, one of three differential mode inductance flux paths (18) is shown in FIG. 3. The other two differential mode flux paths (not shown) are symmetrically located similarly around the core. In some embodiments of the instant invention, the flux path (18) goes through a coil and then separates into two paths forming a triangular path around the center of the core structure. In some embodiments of the instant invention, the common mode flux path (17) is shown in FIG. 3.

In accordance with some embodiments of the instant invention, the common mode inductance is determined by selecting the combination of the following variables: the core material and size, number of coil turns, and the thickness of the common mode gaps (4, 5, 6). The differential mode inductance is determined by selecting the combination of the following variables: the core material and size, number of coil turns, the thickness of the common mode gaps (4, 5, 6), and the thickness of the primary differential mode gaps (7, 8, 9). Since, in accordance with some embodiments of the instant invention, the differential mode flux path has both the common mode gap(s) (4, 5, 6) and the primary differential mode gap(s) (7, 8, 9) along the path, both types of gaps can be independently changed to adjust the differential mode inductance.

In some embodiments of the instant invention, the thickness of the common mode gaps (4, 5, 6) and the thickness of the primary differential mode gaps (7, 8, 9) can independently vary (i.e., the thickness of a particular gap can be changed without regard to thickness(es) of other gap(s)) from 0.005 to 0.25 inch. In some embodiments of the instant invention, the thickness of the common mode gaps (4, 5, 6) and the thickness of the primary differential mode gaps (7, 8, 9) can independently vary from 0.05 to 0.25 inch. In some embodiments of the instant invention, the thickness of the common mode gaps (4, 5, 6) and the thickness of the primary differential mode gaps (7, 8, 9) can independently vary from 0.1 to 0.25 inch. In some embodiments of the instant invention, the thickness of the common mode gaps (4, 5, 6) and the thickness of the primary differential mode gaps (7, 8, 9) can independently vary from 0.15 to 0.25 inch. In some embodiments of the instant invention, the thickness of the common mode gaps (4, 5, 6) and the thickness of the primary differential mode gaps (7, 8, 9) can independently vary from 0.005 to 0.2 inch. In some embodiments of the instant invention, the thickness of the common mode gaps (4, 5, 6) and the thickness of the primary differential mode gaps (7, 8, 9) can independently vary from 0.005 to 0.1 inch.

In some embodiments of the instant invention, the thickness of the common mode gaps (4, 5, 6) and the thickness of the primary differential mode gaps (7, 8, 9) can vary (i.e., all gaps have the same thickness) from 0.005 to 0.25 inch. In some embodiments of the instant invention, the thickness of the common mode gaps (4, 5, 6) and the thickness of the primary differential mode gaps (7, 8, 9) can vary from 0.05 to 0.25 inch. In some embodiments of the instant invention, the thickness of the common mode gaps (4, 5, 6) and the thickness of the primary differential mode gaps (7, 8, 9) can vary from 0.1 to 0.25 inch. In some embodiments of the instant invention, the thickness of the common mode gaps (4, 5, 6) and the thickness of the primary differential mode gaps (7, 8, 9) can vary from 0.15 to 0.25 inch. In some embodiments of the instant invention, the thickness of the common mode gaps (4, 5, 6) and the thickness of the primary differential mode gaps (7, 8, 9) can vary from 0.005 to 0.2 inch. In some embodiments of the instant invention, the thickness of the common mode gaps (4, 5, 6) and the thickness of the primary differential mode gaps (7, 8, 9) can vary from 0.005 to 0.1 inch.

In some embodiments of the instant invention, the thickness of the common mode gaps (4, 5, 6) and the thickness of the primary differential mode gaps (7, 8, 9) can independently vary from 0.005 to 1.5 inches. In some embodiments of the instant invention, the thickness of the common mode gaps (4, 5, 6) and the thickness of the primary differential mode gaps (7, 8, 9) can independently vary from 0.05 to 1.5 inches. In some embodiments of the instant invention, the thickness of the common mode gaps (4, 5, 6) and the thickness of the primary differential mode gaps (7, 8, 9) can independently vary from 0.1 to 1.5 inches. In some embodiments of the instant invention, the thickness of the common mode gaps (4, 5, 6) and the thickness of the primary differential mode gaps (7, 8, 9) can independently vary from 0.15 to 1.5 inches. In some embodiments of the instant invention, the thickness of the common mode gaps (4, 5, 6) and the thickness of the primary differential mode gaps (7, 8, 9) can independently vary from 0.005 to 1 inch. In some embodiments of the instant invention, the thickness of the common mode gaps (4, 5, 6) and the thickness of the primary differential mode gaps (7, 8, 9) can independently vary from 0.005 to 0.5 inch.

In some embodiments of the instant invention, the thickness of the common mode gaps (4, 5, 6) and the thickness of the primary differential mode gaps (7, 8, 9) can vary from 0.005 to 1.5 inches. In some embodiments of the instant invention, the thickness of the common mode gaps (4, 5, 6) and the thickness of the primary differential mode gaps (7, 8, 9) can vary from 0.05 to 1.5 inches. In some embodiments of the instant invention, the thickness of the common mode gaps (4, 5, 6) and the thickness of the primary differential mode gaps (7, 8, 9) can vary from 0.1 to 1.5 inches. In some embodiments of the instant invention, the thickness of the common mode gaps (4, 5, 6) and the thickness of the primary differential mode gaps (7, 8, 9) can vary from 0.15 to 1.5 inches. In some embodiments of the instant invention, the thickness of the common mode gaps (4, 5, 6) and the thickness of the primary differential mode gaps (7, 8, 9) can vary from 0.005 to 1 inch. In some embodiments of the instant invention, the thickness of the common mode gaps (4, 5, 6) and the thickness of the primary differential mode gaps (7, 8, 9) can vary from 0.005 to 0.5 inch.

In accordance with some embodiments of the instant invention, the differential mode gaps are placed at a 90 degree angle to the common mode gaps as shown in FIG. 3. In accordance with some embodiments of the instant invention, the 90 degree angle allows the differential mode gaps and the common mode gaps to be adjusted independently during the design and/or manufacturing without modifying shape and/or size of the individual core piece/segment (1, 2, 3) (i.e., the positioning of the individual core pieces/segments relative to each other within the exemplary core can be adjusted during the design and/or manufacturing without modifying shape and/or size of each individual core piece/segment (1, 2, 3)—the exemplary inductor during the operation has core pieces/segments in a fixed position relative to each other).

Figure 4:
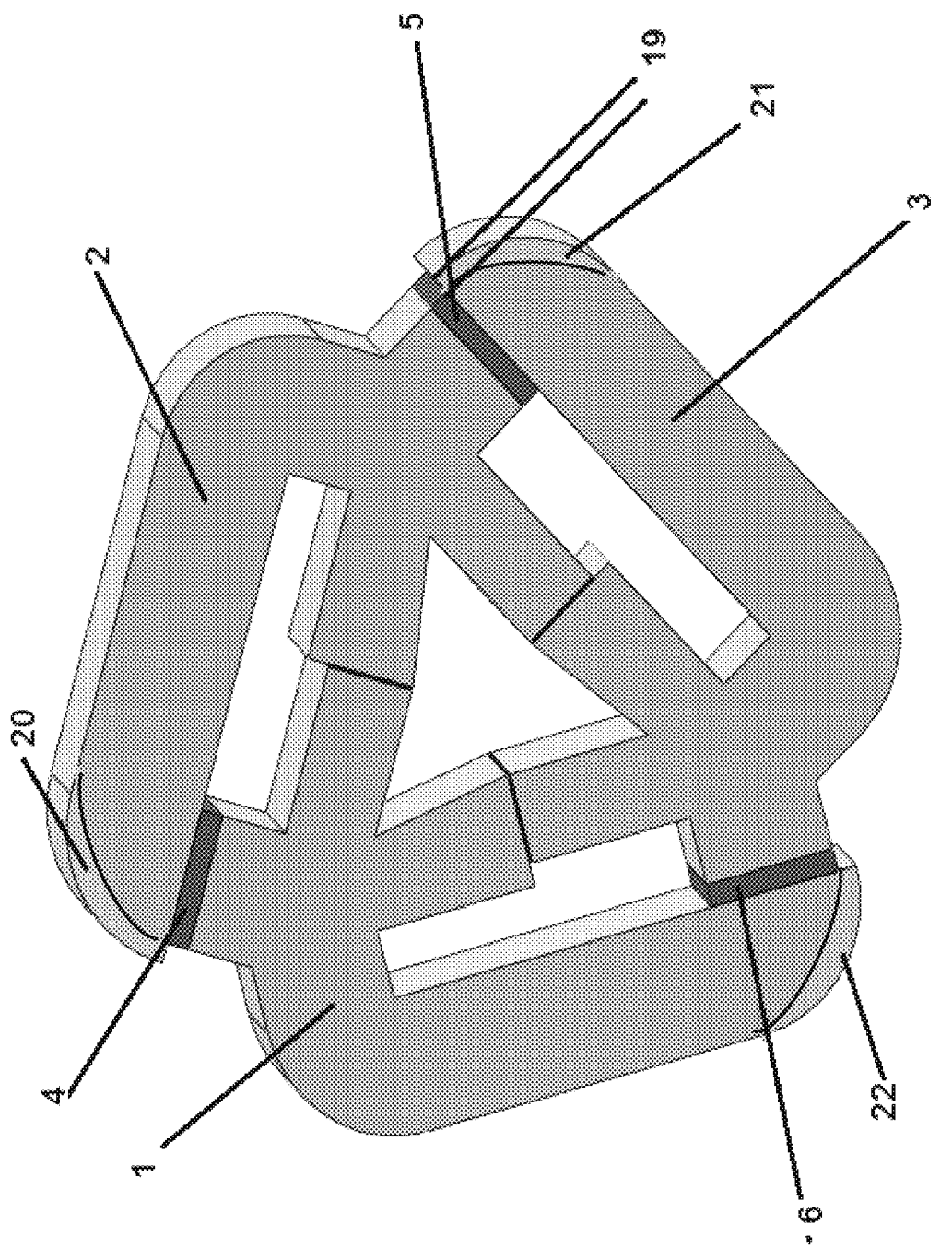
Figure 5:
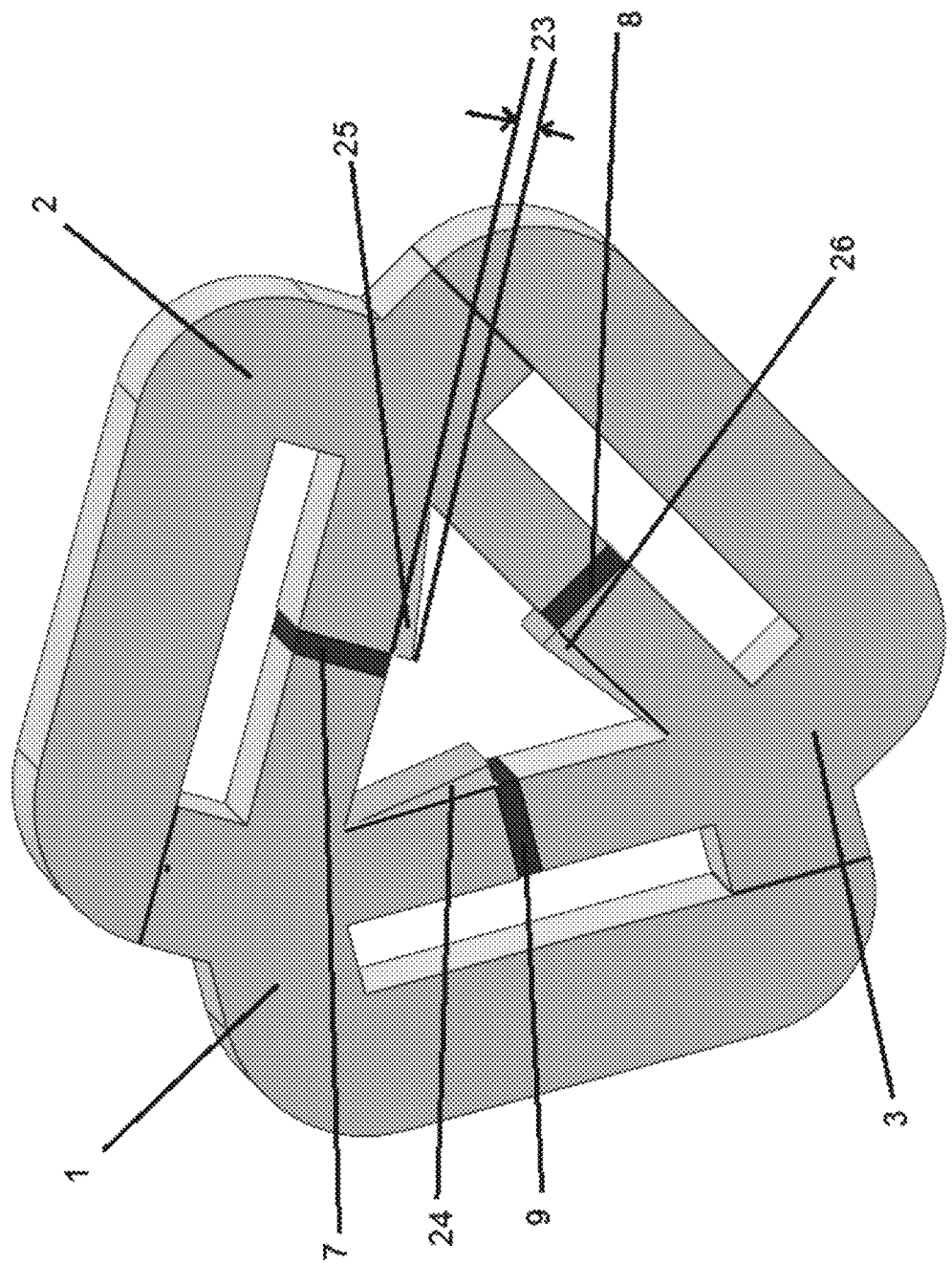

In accordance with some embodiments of the instant invention, FIG. 4 shows how the gaps (7, 8, 9) in FIG. 3 could be reduced to increase the differential mode inductance with only negligibly changing the path of the common mode inductance. In accordance with some embodiments of the instant invention, the differential mode gaps have reduced thickness; therefore reduce reluctance along the differential mode path. In accordance with some embodiments of the instant invention, the extra core material (20, 21, 22) allows for the maximum differential mode primary gap to not reduce the core cross sectional are along the magnetic path. In accordance with some embodiments of the instant invention, the dimension of the extra core material located at (19) is the dimension of the maximum differential mode gap that would be used with a given core piece shape design. As shown in FIG. 4, the exemplary core with increase differential mode inductance, areas (20, 21, 22) are not needed because the material is outside of the magnetic path. As shown in FIG. 5, the exemplary core with increased common mode inductance, the material of areas (20, 21, 22) is used to maintain core cross sectional area when the differential mode gaps (7, 8, 9) are at their maximum. In accordance with some embodiments of the instant invention, the dimension at 19 is the maximum thickness of differential mode gaps can have and still maintain a uniform core cross sectional area along the common mode path 17.

In accordance with some embodiments of the instant invention, FIG. 5 shows how the how the gaps (4, 5, 6) in FIG. 3 could be modified to reduce common mode gap without changing the primary differential mode gaps. In accordance with some embodiments of the instant invention, the extra core material (24, 25, 26) allows for the maximum common mode primary gap to not reduce the core cross sectional are along the inner section of the differential mode magnetic path. In accordance with some embodiments of the instant invention, the dimension located at (23) is the dimension of the maximum common mode gap thickness that would be used with a given core piece shape.

Figure 6:
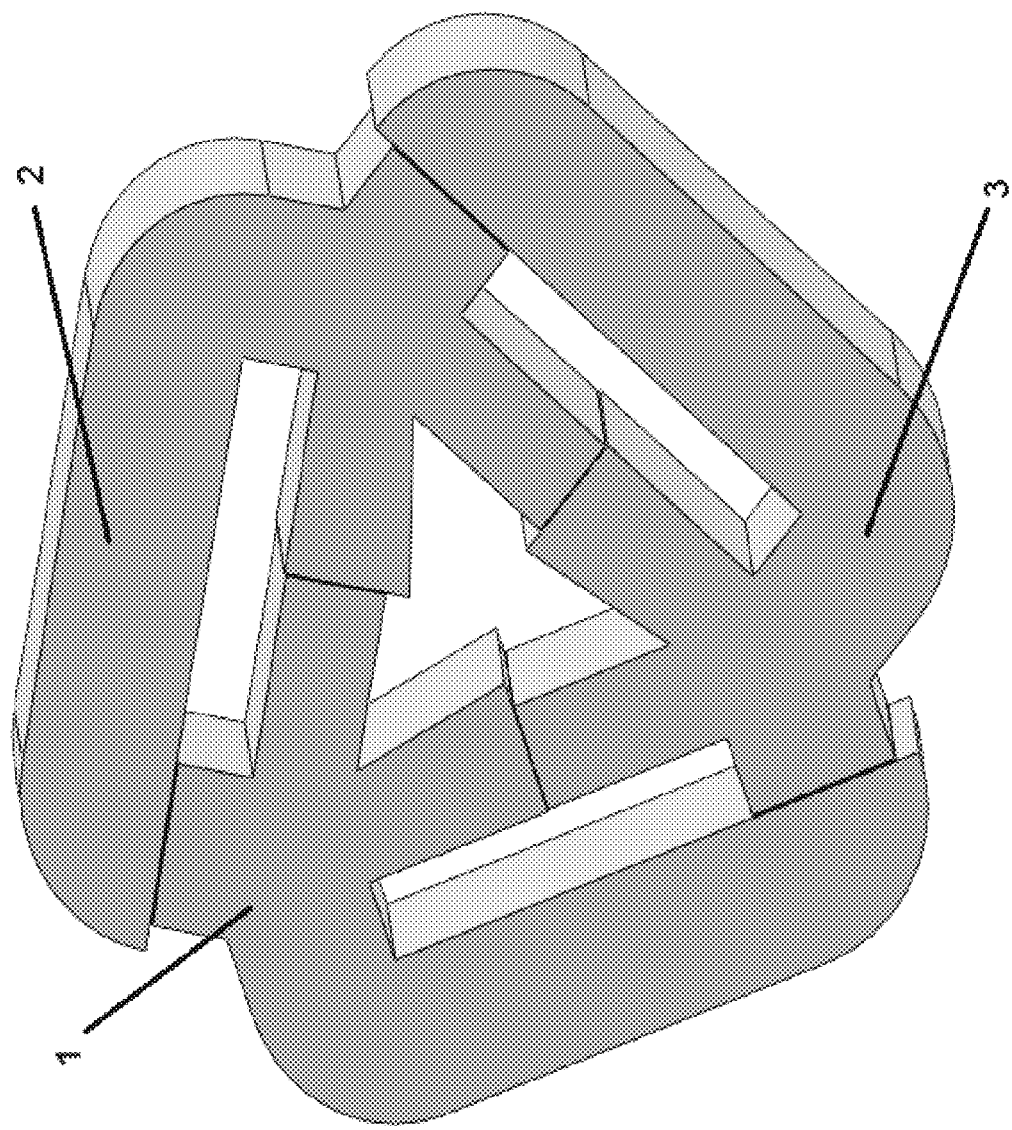
Figure 7:
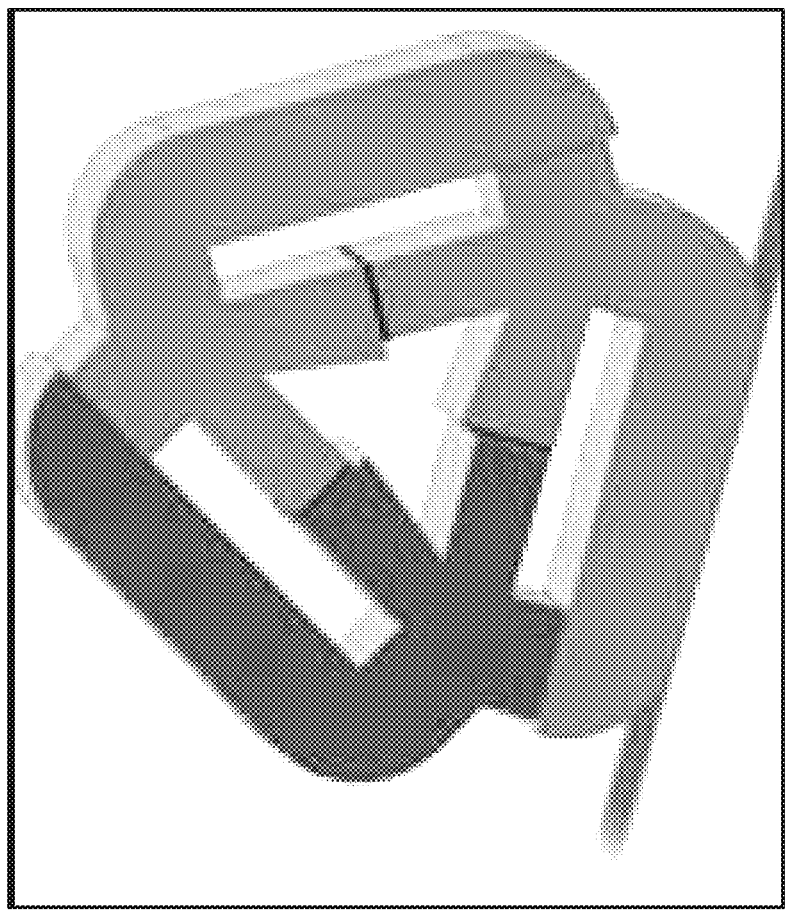
Figure 8:
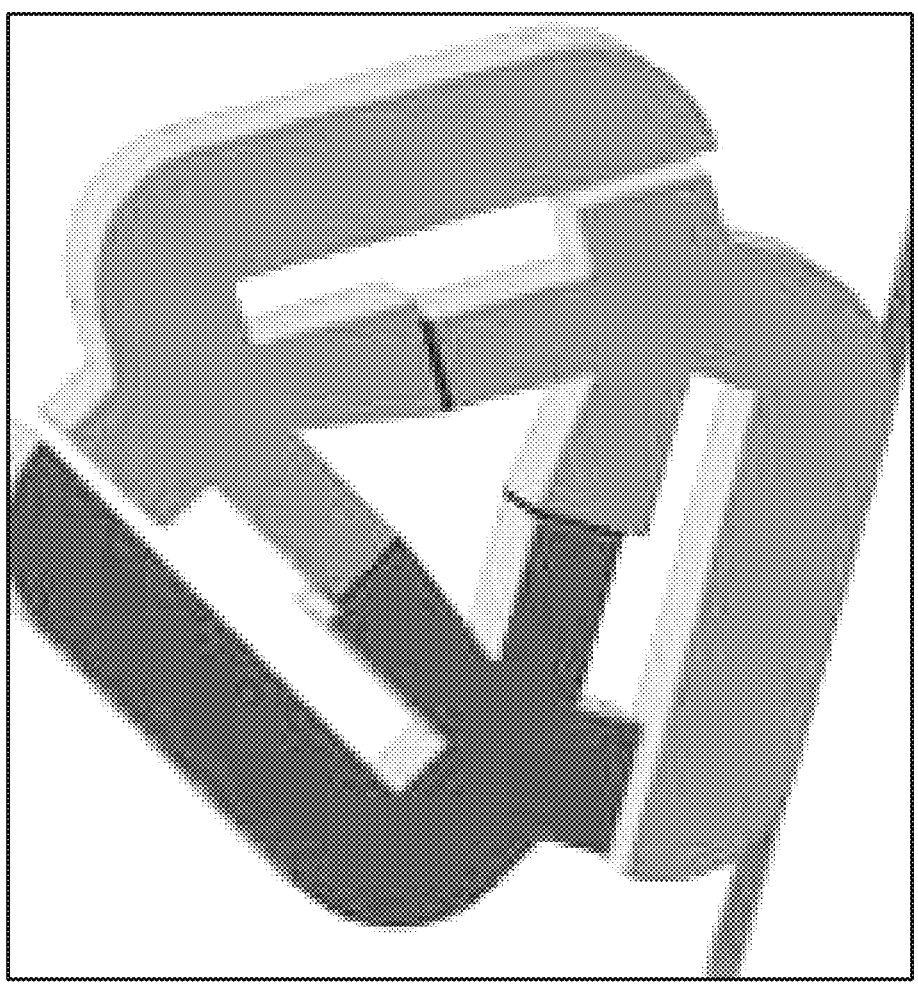
Figure 9:
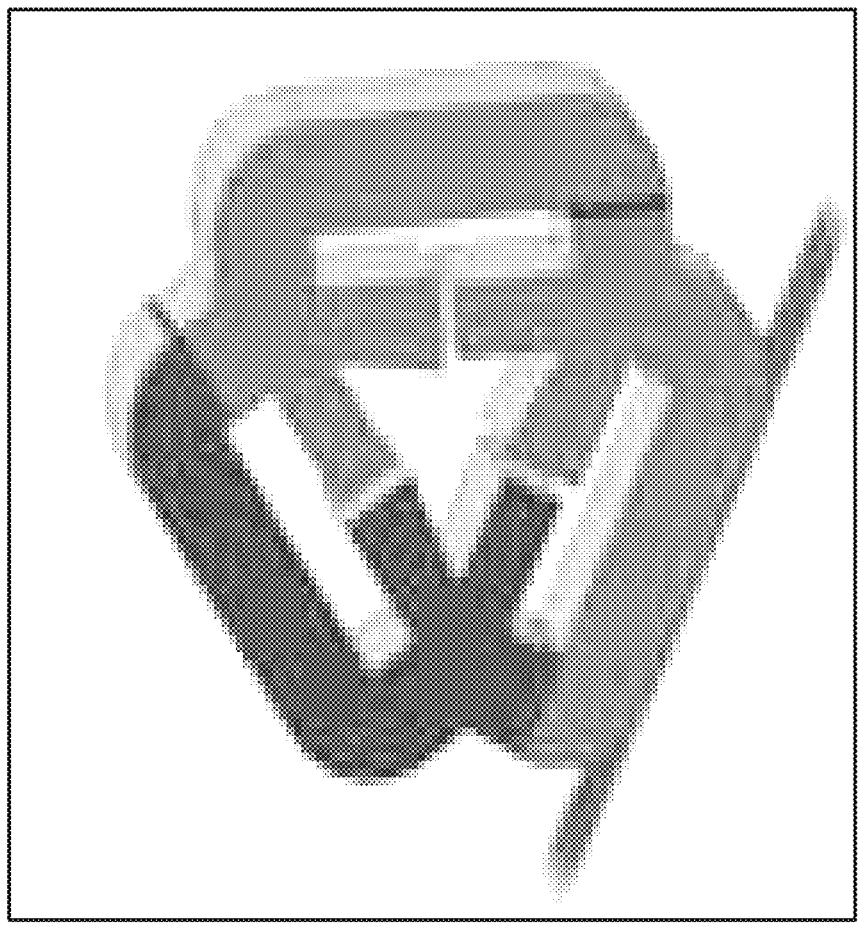
Figure 10:
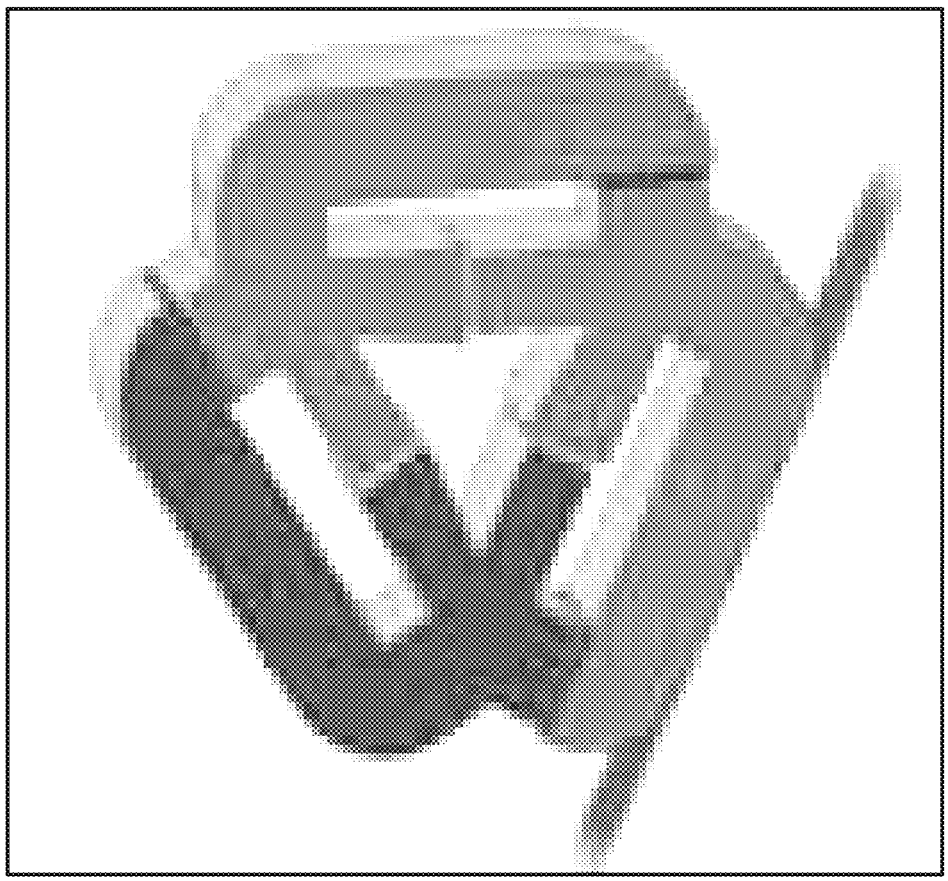
Figure 11:
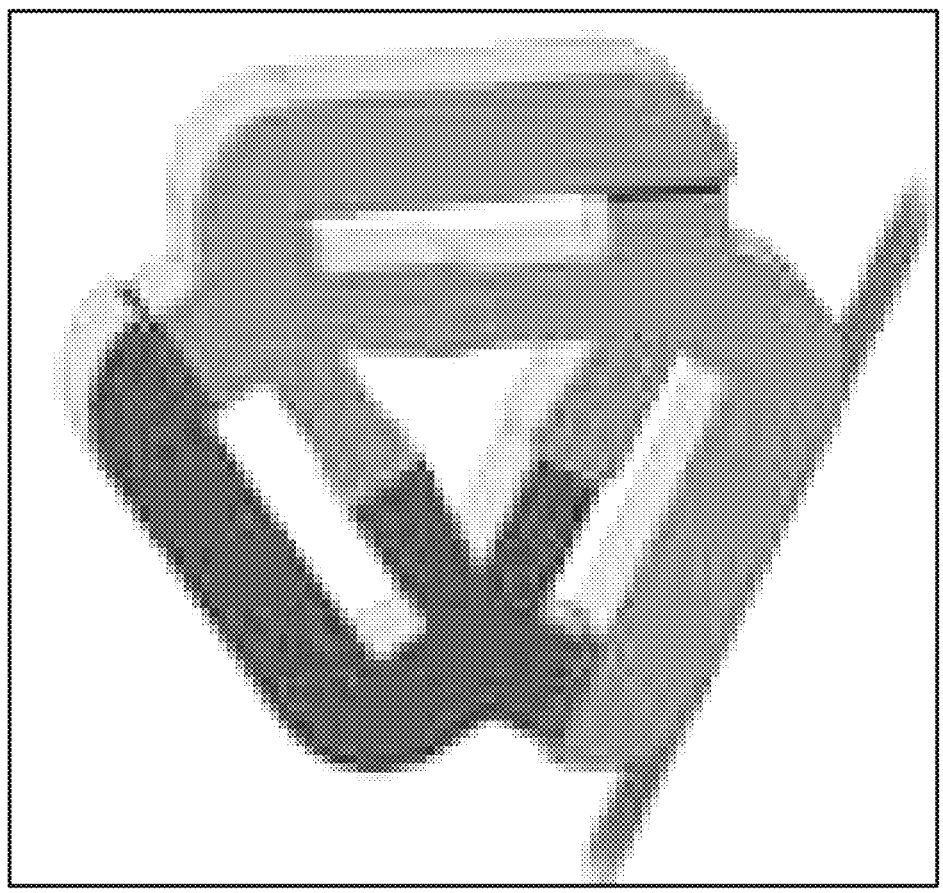
Figure 12:
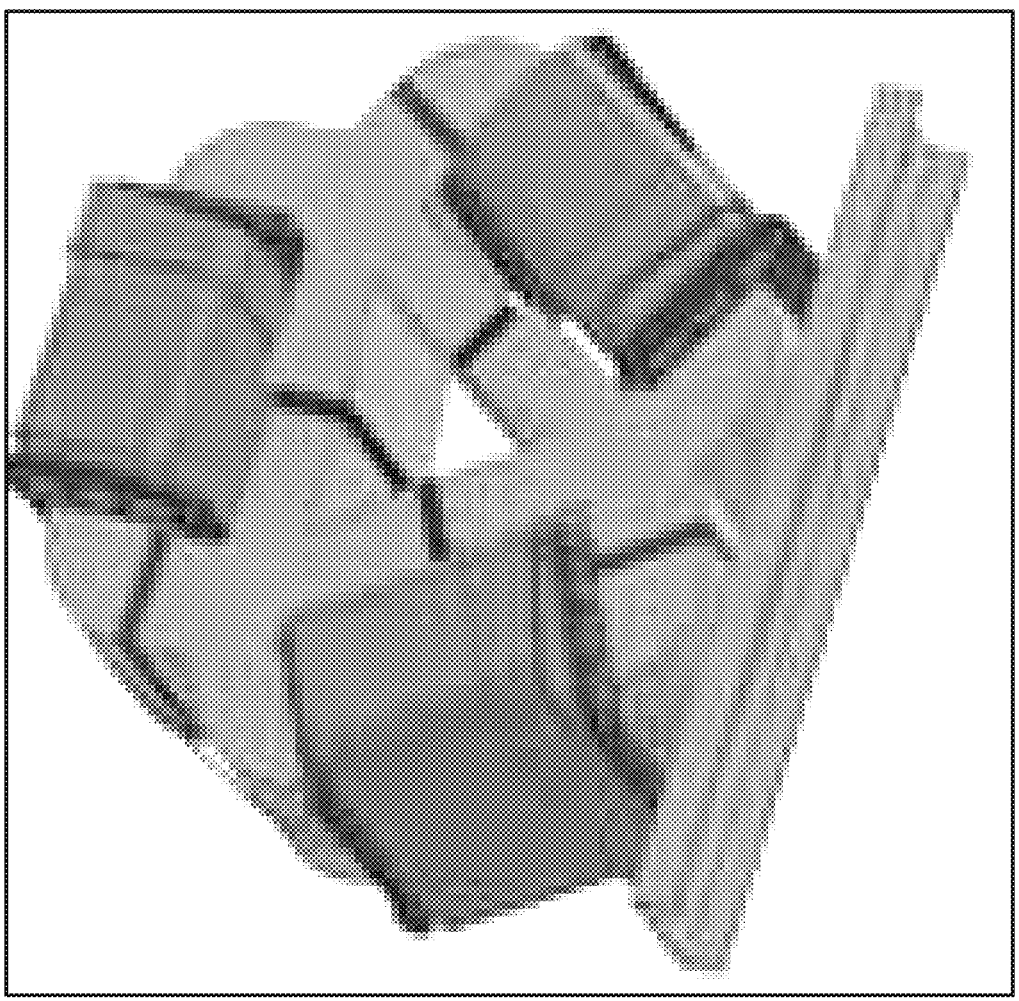
Figure 13:
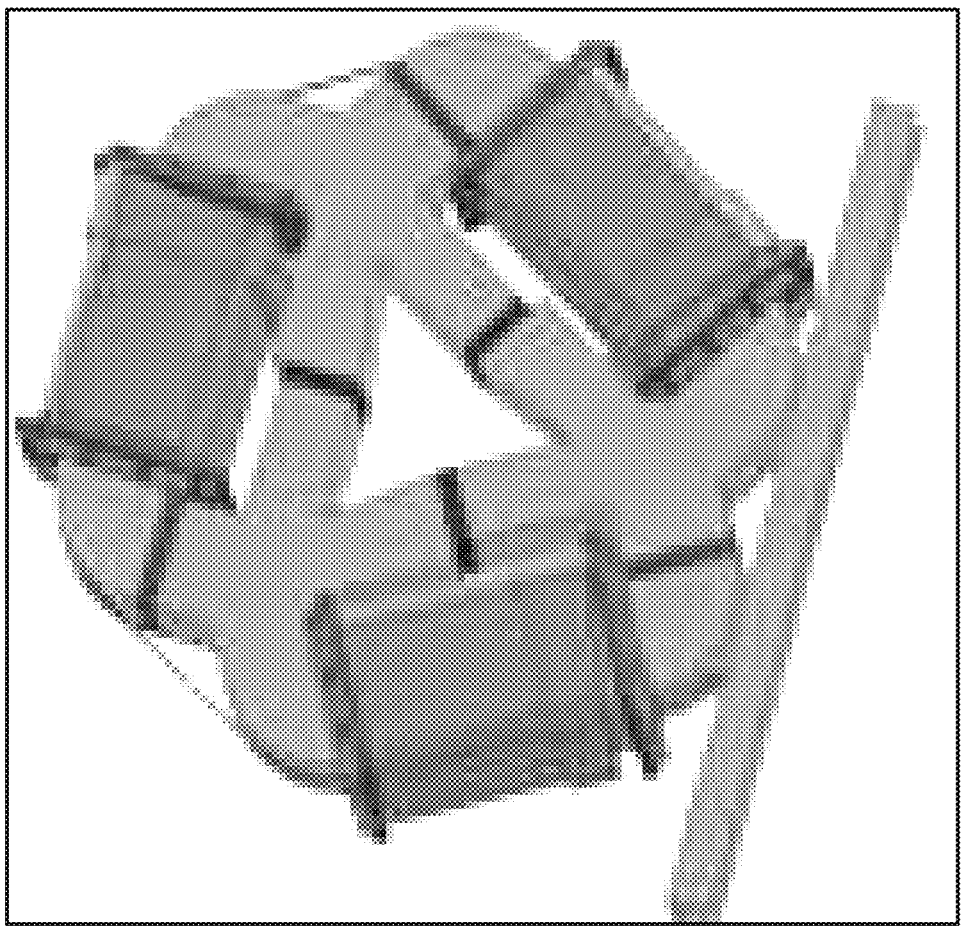

In accordance with some embodiments of the instant invention, as shown in FIG. 6, the core design in FIG. 3 can also be constructed without common mode and/or differential mode gaps. In accordance with some embodiments of the instant invention, the exemplary construction of FIG. 6 will increase the common mode and/or differential mode inductance to the maximum.

In accordance with some embodiments of the instant invention, the common mode gaps (4, 5, 6) and the differential mode gaps (7, 8, 9) are spacers made from materials such as Dupont Nomex and/or fiberglass-reinforced thermoset polyesters, manufactured by Glastic Corporation, Cleveland, Ohio.

In accordance with some embodiments of the instant invention, the coils (13, 14, 15) are wound with materials such as magnet wire, Litz wire, and/or copper foil. In accordance with some embodiments of the instant invention, the coils may have bobbins (10,11,12) which are constructed from material such as Rynite and/or glass-filled nylon. In accordance with some embodiments of the instant invention, the coils use termination such as the brazed terminals (27, 28, 29, 30, 31, 32) or terminal blocks (not shown).

In accordance with some embodiments of the instant invention, the core is assembled through the use of a band, or another suitable attachment mechanism, that extends around the outside shape of the core (33) and may be positioned within a groove in each core segments. In accordance with some embodiments of the instant invention, the band is made from a non-magnetic material such as stainless steel or any other similarly suitable material. In accordance with some embodiments of the instant invention, the band may also attach a mounting bracket (16).

FIGS. 7-13 illustrates how the core structure gaps can be adjusted in accordance with some embodiments of the instant invention.

Figure 14:
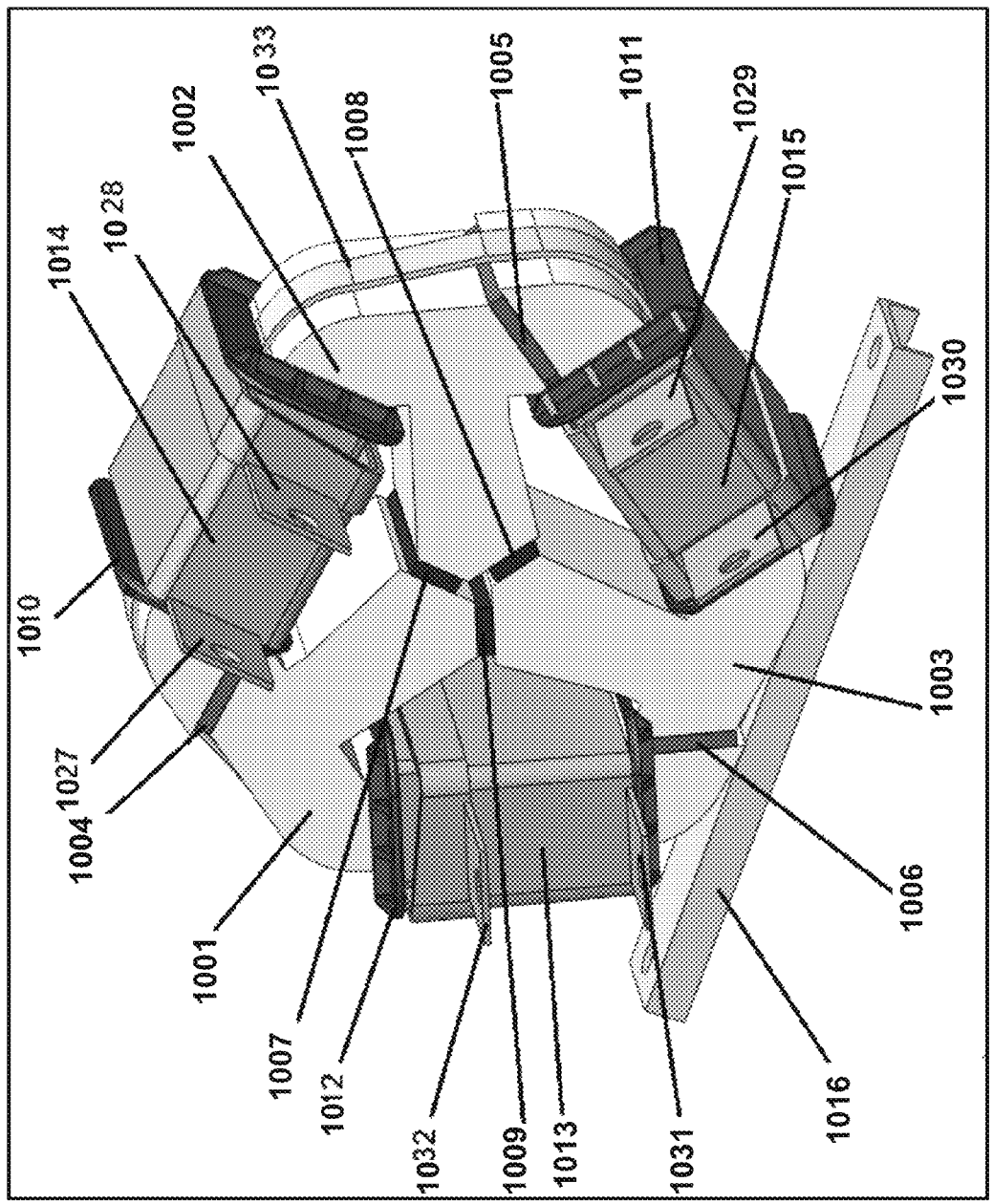

Illustrative Type II Inventive Inductors in Accordance with Some Embodiments of the Instant Invention FIG. 14 shows a snapshot of an exemplary construction of type II inventive inductors in accordance with some embodiments of the instant invention. In accordance with some embodiments of the instant invention, once the core pieces and coils are manufactured, the common mode and differential mode inductances can be independently tuned by adjusting the gaps.

Figure 15:
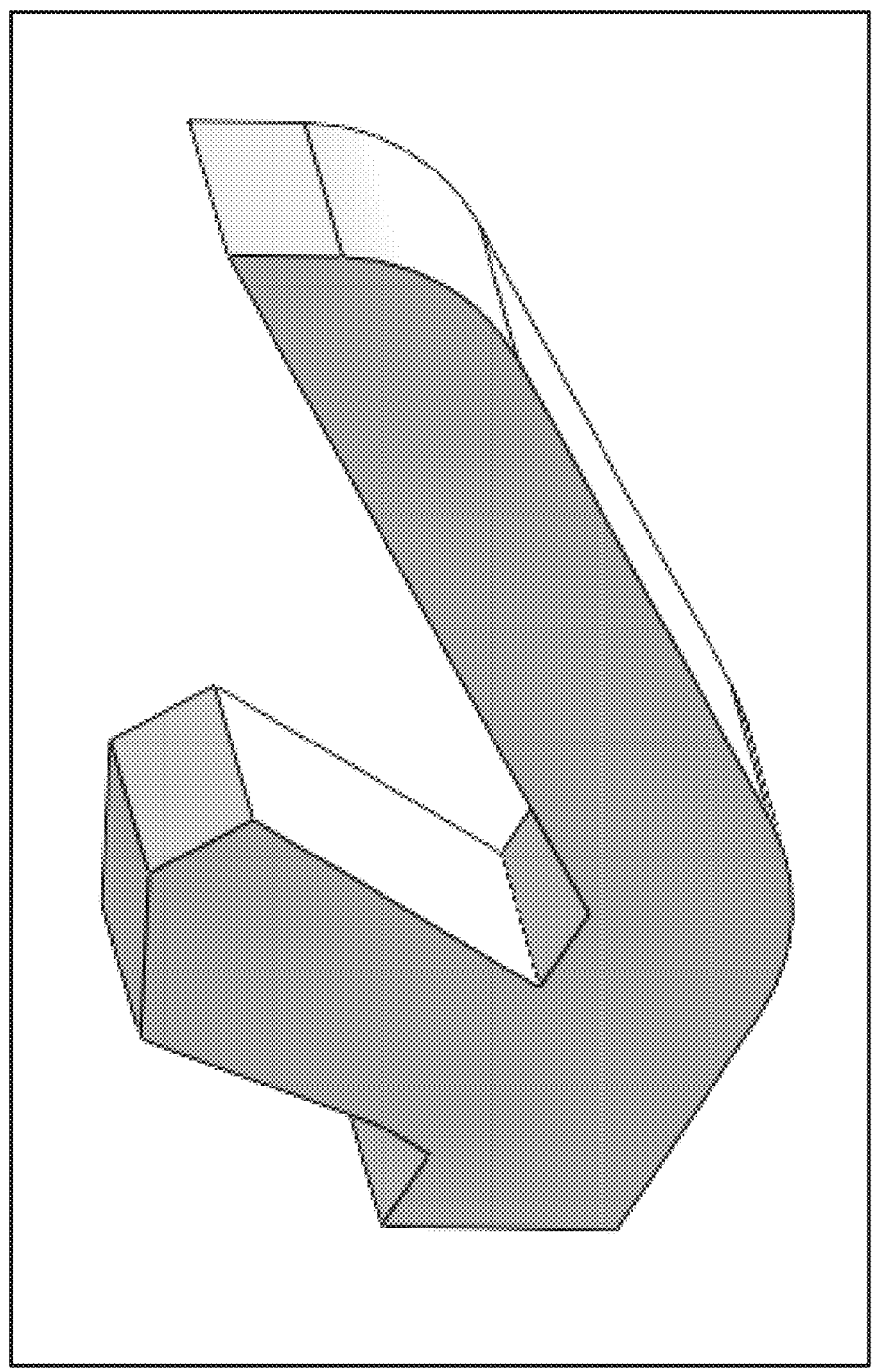

In some embodiments of the instant invention, the exemplary construction of type II inventive inductors can have a core that is constructed from three pieces (1001, 1002, 1003), made from core materials such as powered iron, molypermalloy, ferrite, steel laminations, sendust, or from any other similarly suitable material. In accordance with some embodiments of the instant invention, an exemplary individual core piece is shown in FIG. 15.

Figure 16:
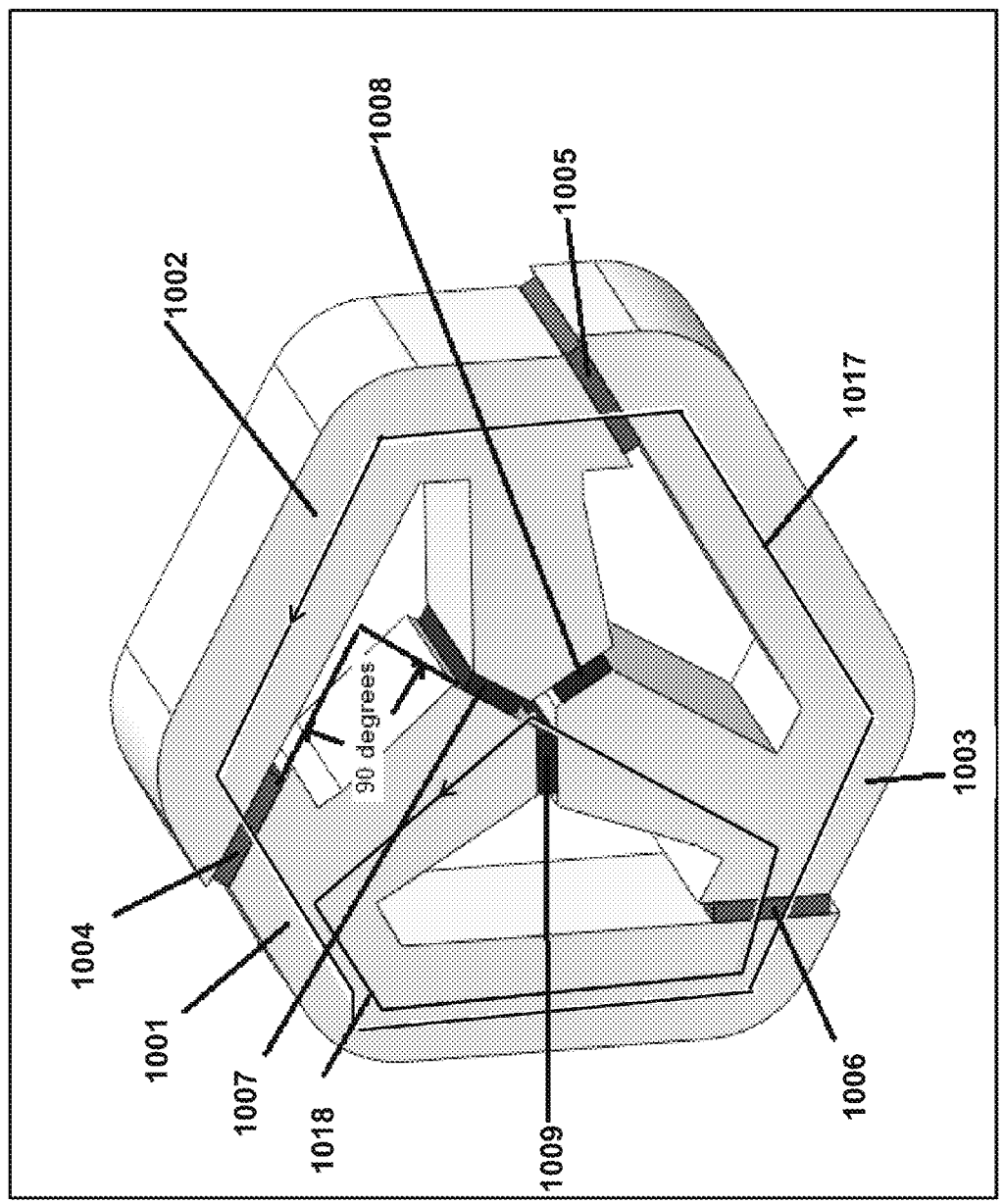

FIG. 16 shows a more detailed view of the exemplary core structure of the exemplary construction of type II inventive inductors with the three core pieces in accordance with some embodiments of the instant invention. In some embodiments of the instant invention, one of three differential mode inductance flux paths (1018) is shown in FIG. 16. The other two differential mode flux paths (not shown) are symmetrically located similarly around the core. In some embodiments of the instant invention, the flux path (1018) goes through a coil and the center of the core structure. In some embodiments of the instant invention, the common mode flux path (1017) is shown in FIG. 16. In accordance with some embodiments of the instant invention, the common mode inductance is determined by selecting the combination of the following variables: the core material and size, number of coil turns, and the thickness of the common mode gaps (1004, 1005, 1006). In some embodiments, the differential mode inductance is determined by selecting the combination of the following variables: the core material and size, number of coil turns, the thickness of the common mode gaps (1004, 1005, 1006), and the thickness of the primary differential mode gaps (1007, 1008, 1009). Since, in accordance with some embodiments of the instant invention, the differential mode flux path has both the common mode gap(s) (1004, 1005, 1006) and the primary differential mode gap(s) (1007, 1008, 1009) along the path, both types of gaps can be independently changed to adjust the differential mode inductance.

In some embodiments of the instant invention, the thickness of the common mode gaps (1004, 1005, 1006) and the thickness of the primary differential mode gaps (1007, 1008, 1009) can independently vary from 0.005 to 0.25 inch. In some embodiments of the instant invention, the thickness of the common mode gaps (1004, 1005, 1006) and the thickness of the primary differential mode gaps (1007, 1008, 1009) can independently vary from 0.05 to 0.25 inch. In some embodiments of the instant invention, the thickness of the common mode gaps (1004, 1005, 1006) and the thickness of the primary differential mode gaps (1007, 1008, 1009) can independently vary from 0.1 to 0.25 inch. In some embodiments of the instant invention, the thickness of the common mode gaps (1004, 1005, 1006) and the thickness of the primary differential mode gaps (1007, 1008, 1009) can independently vary from 0.15 to 0.25 inch. In some embodiments of the instant invention, the thickness of the common mode gaps (1004, 1005, 1006) and the thickness of the primary differential mode gaps (1007, 1008, 1009) can independently vary from 0.005 to 0.2 inch. In some embodiments of the instant invention, the thickness of the common mode gaps (1004, 1005, 1006) and the thickness of the primary differential mode gaps (1007, 1008, 1009) can independently vary from 0.005 to 0.1 inch.

In some embodiments of the instant invention, the thickness of the common mode gaps (1004, 1005, 1006) and the thickness of the primary differential mode gaps (1007, 1008, 1009) can vary from 0.005 to 0.25 inch. In some embodiments of the instant invention, the thickness of the common mode gaps (1004, 1005, 1006) and the thickness of the primary differential mode gaps (1007, 1008, 1009) can vary from 0.05 to 0.25 inch. In some embodiments of the instant invention, the thickness of the common mode gaps (1004, 1005, 1006) and the thickness of the primary differential mode gaps (1007, 1008, 1009) can vary from 0.1 to 0.25 inch. In some embodiments of the instant invention, the thickness of the common mode gaps (1004, 1005, 1006) and the thickness of the primary differential mode gaps (1007, 1008, 1009) can vary from 0.15 to 0.25 inch. In some embodiments of the instant invention, the thickness of the common mode gaps (1004, 1005, 1006) and the thickness of the primary differential mode gaps (1007, 1008, 1009) can vary from 0.005 to 0.2 inch. In some embodiments of the instant invention, the thickness of the common mode gaps (1004, 1005, 1006) and the thickness of the primary differential mode gaps (1007, 1008, 1009) can vary from 0.005 to 0.1 inch.

In some embodiments of the instant invention, the thickness of the common mode gaps (1004, 1005, 1006) and the thickness of the primary differential mode gaps (1007, 1008, 1009) can independently vary from 0.005 to 1.5 inches. In some embodiments of the instant invention, the thickness of the common mode gaps (1004, 1005, 1006) and the thickness of the primary differential mode gaps (1007, 1008, 1009) can independently vary from 0.05 to 1.5 inches. In some embodiments of the instant invention, the thickness of the common mode gaps (1004, 1005, 1006) and the thickness of the primary differential mode gaps (1007, 1008, 1009) can independently vary from 0.1 to 1.5 inches. In some embodiments of the instant invention, the thickness of the common mode gaps (1004, 1005, 1006) and the thickness of the primary differential mode gaps (1007, 1008, 1009) can independently vary from 0.15 to 1.5 inches. In some embodiments of the instant invention, the thickness of the common mode gaps (1004, 1005, 1006) and the thickness of the primary differential mode gaps (1007, 1008, 1009) can independently vary from 0.005 to 1 inch. In some embodiments of the instant invention, the thickness of the common mode gaps (1004, 1005, 1006) and the thickness of the primary differential mode gaps (1007, 1008, 1009) can independently vary from 0.005 to 0.5 inch.

In some embodiments of the instant invention, the thickness of the common mode gaps (1004, 1005, 1006) and the thickness of the primary differential mode gaps (1007, 1008, 1009) can vary from 0.005 to 1.5 inches. In some embodiments of the instant invention, the thickness of the common mode gaps (1004, 1005, 1006) and the thickness of the primary differential mode gaps (1007, 1008, 1009) can vary from 0.05 to 1.5 inches. In some embodiments of the instant invention, the thickness of the common mode gaps (1004, 1005, 1006) and the thickness of the primary differential mode gaps (1007, 1008, 1009) can vary from 0.1 to 1.5 inches. In some embodiments of the instant invention, the thickness of the common mode gaps (1004, 1005, 1006) and the thickness of the primary differential mode gaps (1007, 1008, 1009) can vary from 0.15 to 1.5 inches. In some embodiments of the instant invention, the thickness of the common mode gaps (1004, 1005, 1006) and the thickness of the primary differential mode gaps (1007, 1008, 1009) can vary from 0.005 to 1 inch. In some embodiments of the instant invention, the thickness of the common mode gaps (1004, 1005, 1006) and the thickness of the primary differential mode gaps (1007, 1008, 1009) can vary from 0.005 to 0.5 inch.

In accordance with some embodiments of the instant invention, the differential mode gaps are placed at a 90 degree angle to the common mode gaps as shown in FIG. 16. In accordance with some embodiments of the instant invention, the 90 degree angle allows the differential mode gaps and the common mode gaps to be adjusted independently during the design and/or manufacturing without modifying shape and/or size of the individual core piece/segment (1001, 1002, 1003) (i.e., the positioning of the individual core pieces/segments relative to each other within the exemplary core can be adjusted during the design and/or manufacturing without modifying shape and/or size of each individual core piece/segment (1001, 1002, 1003)—the exemplary inductor during the operation has core pieces/segments in a fixed position relative to each other).

Figure 17:
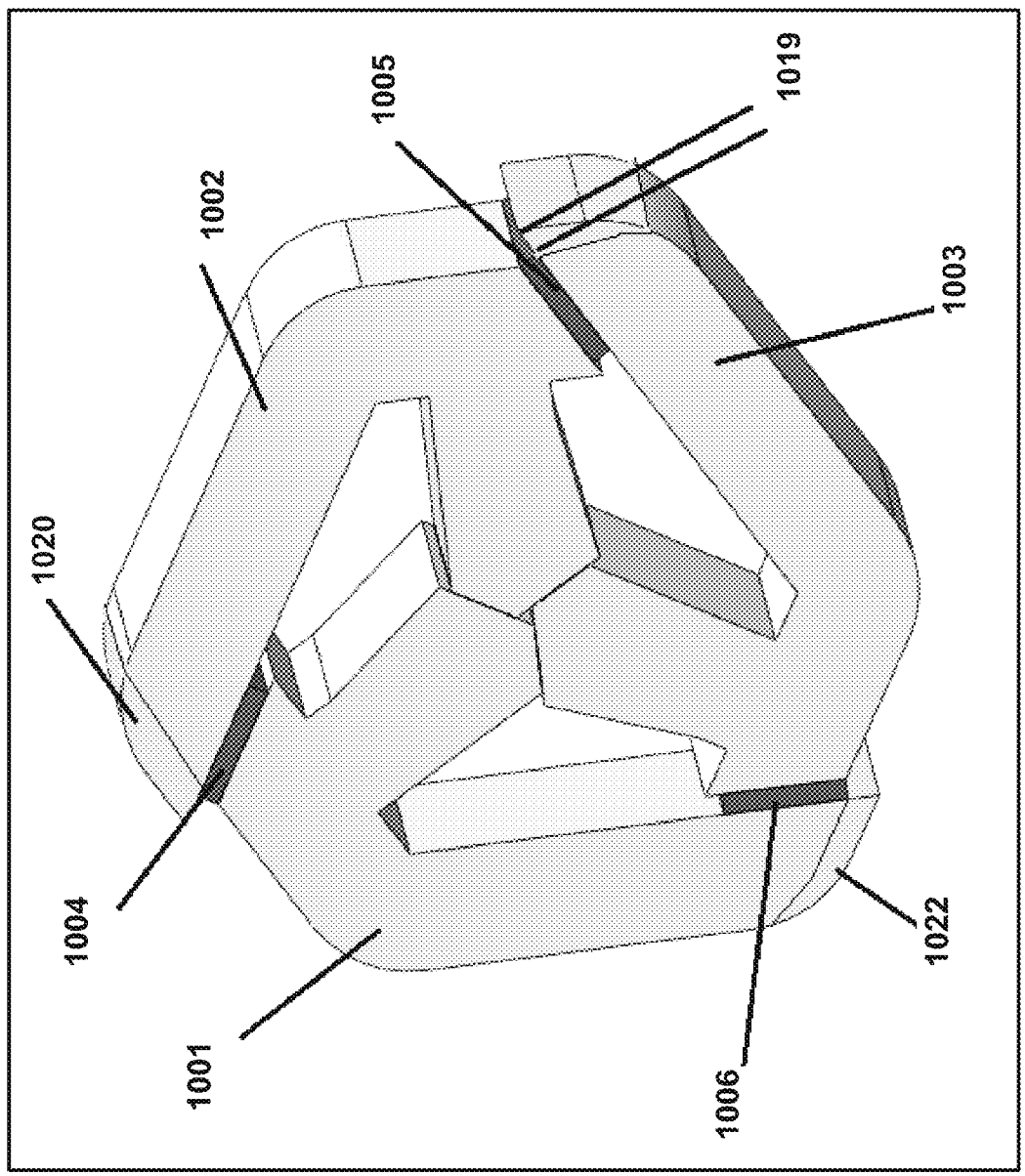

In accordance with some embodiments of the instant invention, FIG. 17 shows how the gaps (1007, 1008, 1009) in FIG. 16 could be reduced to increase the differential mode inductance with only negligibly changing the path of the common mode inductance. In accordance with some embodiments of the instant invention, the differential mode gaps have reduced thickness; therefore reduce reluctance along the differential mode path. In accordance with some embodiments of the instant invention, the extra core material (1020, 1021, 1022) allows for the maximum differential mode primary gap to not reduce the core cross sectional area along the magnetic path. In accordance with some embodiments of the instant invention, the dimension of the extra core material located at (1019) is the dimension of the maximum differential mode gap that would be used with the given core piece shape design.

Figure 18:
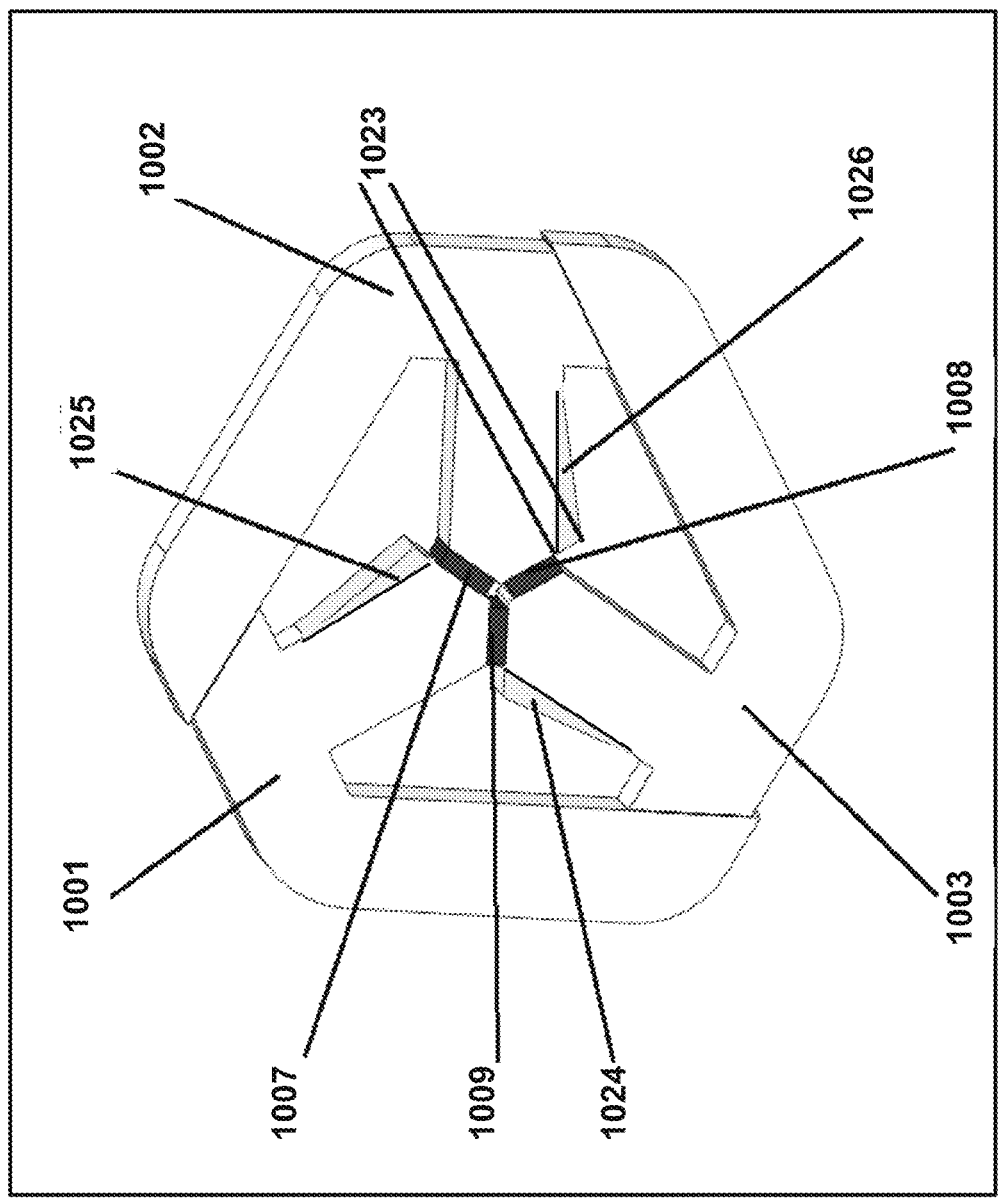

In accordance with some embodiments of the instant invention, FIG. 18 shows how the how the gaps (1004, 1005, 1006) in FIG. 16 could be modified to reduce common mode gap without changing the primary differential mode gaps. In accordance with some embodiments of the instant invention, the extra core material (1024, 1025, 1026) allows for the maximum common mode primary gap to not reduce the core cross sectional area along the inner section of the differential mode magnetic path. In accordance with some embodiments of the instant invention, the dimension located at (1023) is the dimension of the maximum common mode gap thickness that would be used with the given core piece shape.

Figure 19:
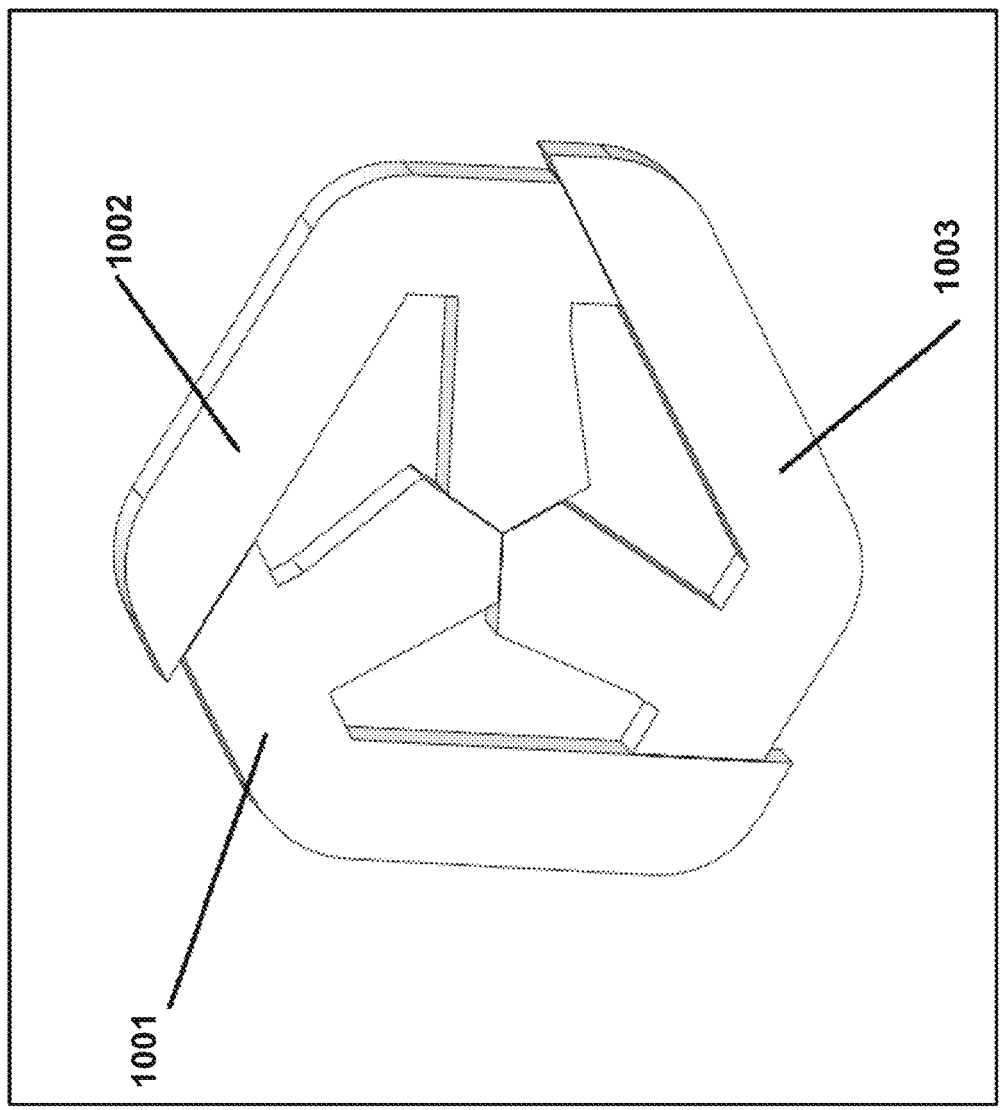

In accordance with some embodiments of the instant invention, as shown in FIG. 19, the core design in FIG. 16 can also be constructed without common mode and/or differential mode gaps. In accordance with some embodiments of the instant invention, such construction increases the common mode and/or differential mode inductance to the maximum.

In accordance with some embodiments of the instant invention, the common mode gaps (1004, 1005, 1006) and the differential mode gaps (1007, 1008, 1009) are spacers made from materials such as Dupont Nomex and/or fiberglass-reinforced thermoset polyesters, manufactured by Glastic Corporation, Cleveland, Ohio.

In accordance with some embodiments of the instant invention, the coils (1013, 1014, 1015) are wound with materials such as magnet wire, Litz wire, and/or copper foil. In accordance with some embodiments of the instant invention, the coils can have bobbins (1010, 1011, 1012) which are constructed from material such as Rynite and/or glass-filled nylon. In accordance with some embodiments of the instant invention, the coils use termination such as the brazed terminals (1027, 1028, 1029, 1030, 1031, 1032) or terminal blocks (not shown).

In accordance with some embodiments of the instant invention, the exemplary core is assembled through the use of a band, or another suitable attachment mechanism, that extends around the outside shape of the core (1033) which may be positioned within a groove in each core segments. In accordance with some embodiments of the instant invention, the band is made from a non-magnetic material such as stainless steel or any other similarly suitable material. In accordance with some embodiments of the instant invention, the band may also attach a mounting bracket (1016).

In accordance with some embodiments of the instant invention, the inductors of the instant invention can be constructed utilizing various suitable methods. For example, the core pieces/segments (1, 2, 3, 1001, 1002, 1003) can be constructed to have a suitable cross section (e.g., rectangular) to allow bobbins having similar cross section shape to slide onto a leg of a corresponding core piece of the core pieces/segments (1, 2, 3, 1001, 1002, 1003), and, thus, allow for bobbins to be separately constructed.

In accordance with some embodiments of the instant invention, the inductors of the instant invention can be combined with various suitable winding configurations.

Figure 20:
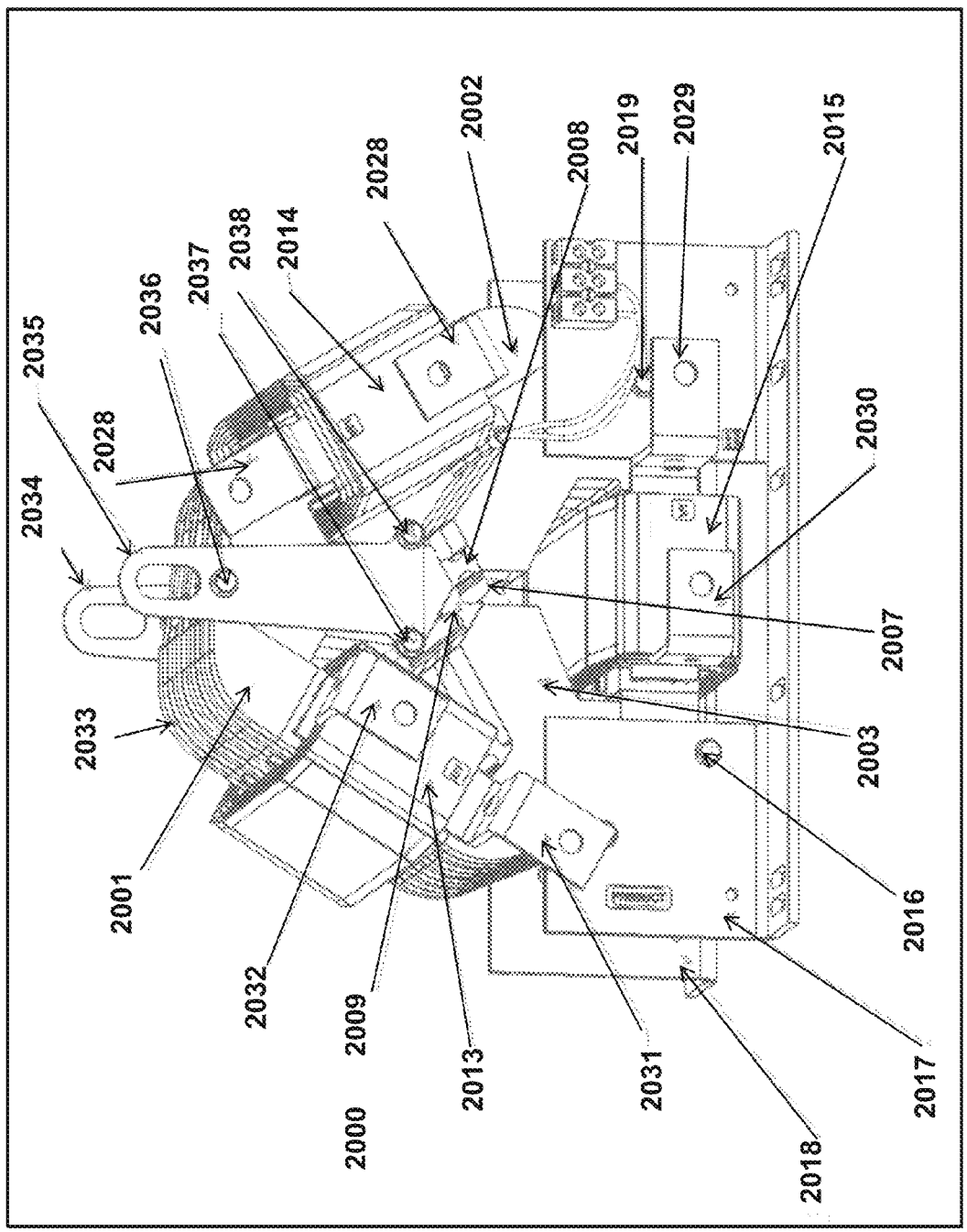
Figure 21:
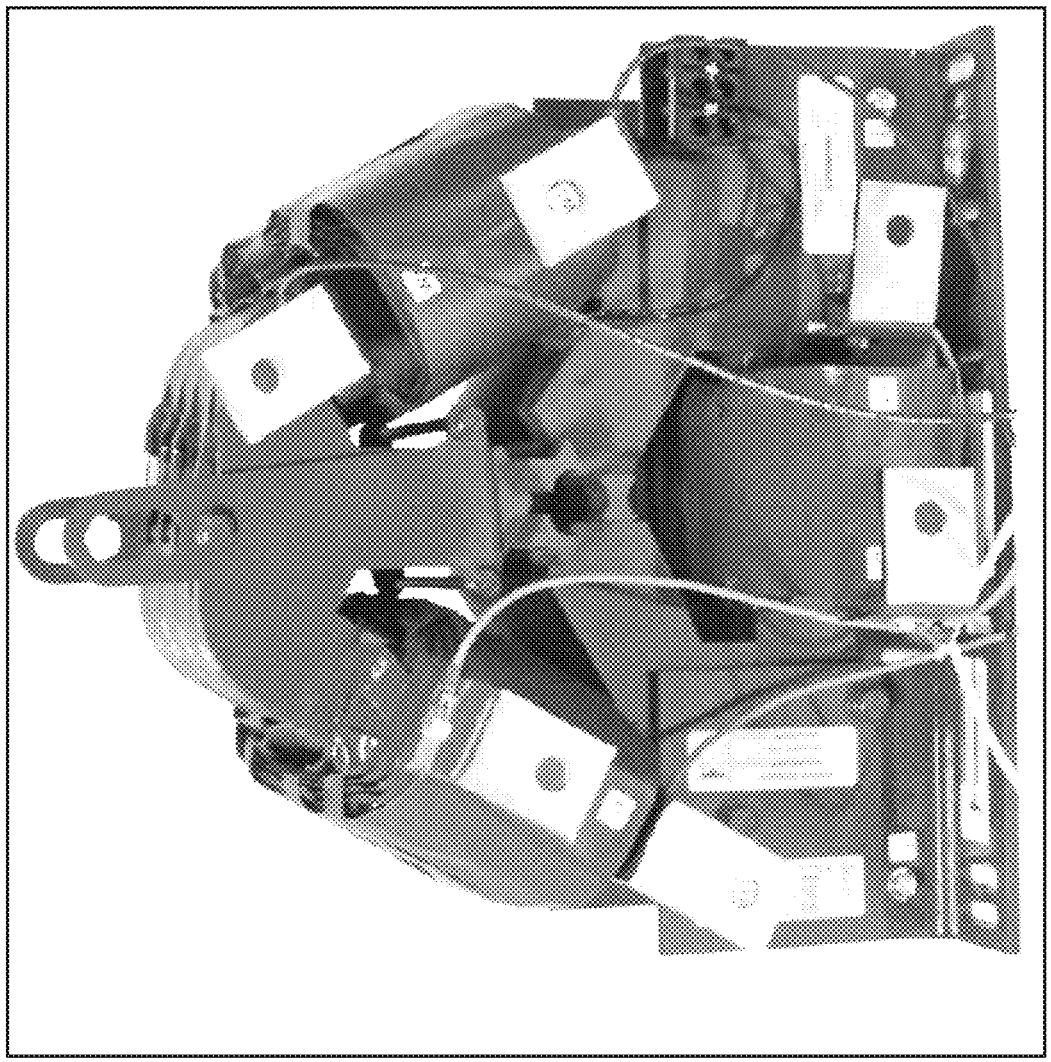
Figure 22:
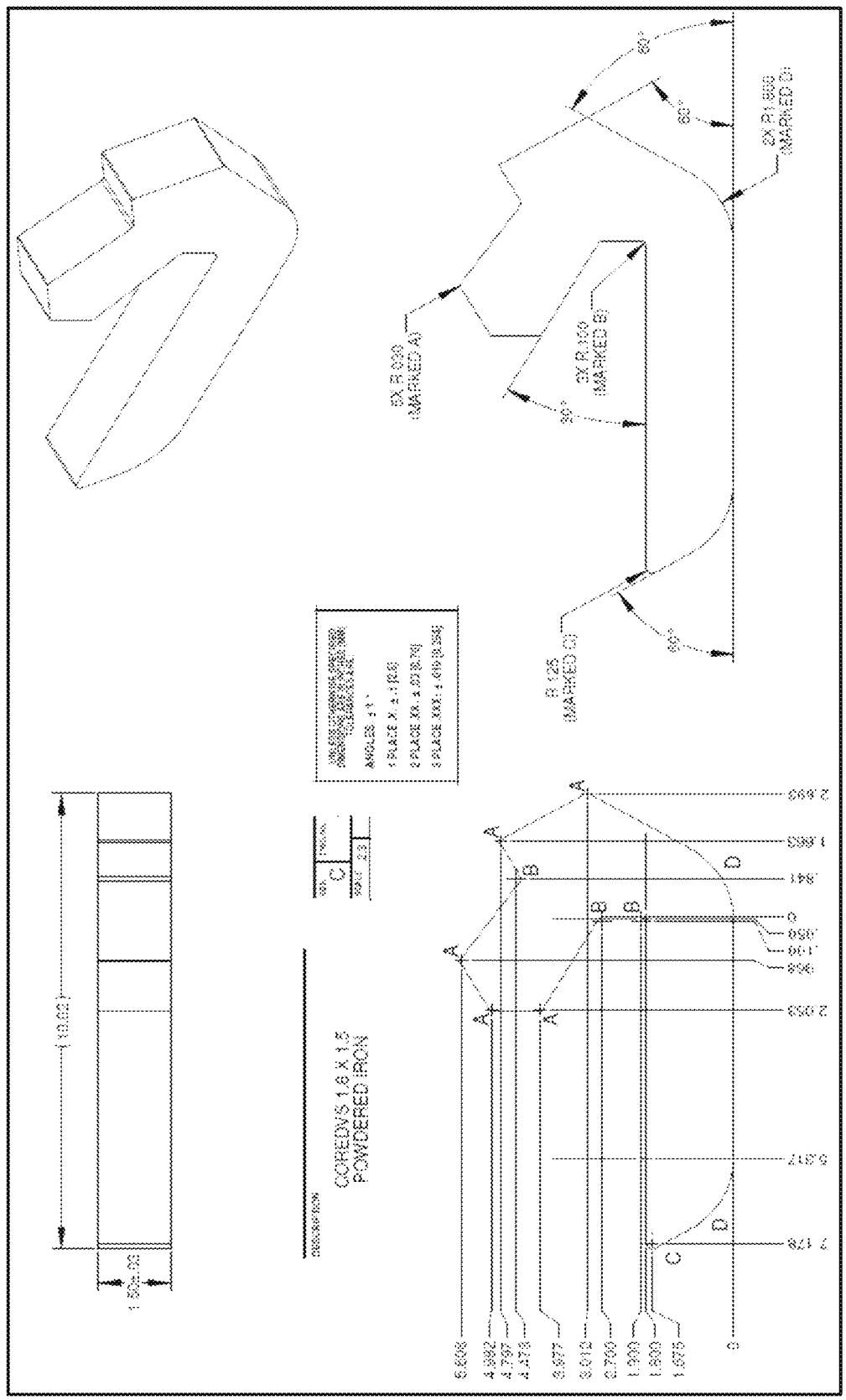

Further Illustrative Aspects of the Inventive Inductors in Accordance with Some Embodiments of the Instant Invention Illustrative RMS (Root-Mean-Square) Current Rating Inductors FIGS. 20 and 21 show an exemplary 500 A RMS (Root-Mean-Square) current rating embodiment. In accordance with some embodiments of the instant invention, the inductor (200) of FIGS. 20 and 21 is designed to have 26 uH of differential mode inductance and 62 uH of common mode inductance. In accordance with some embodiments of the instant invention, an exemplary core structure is made from a total of 12 individual core pieces (as shown in FIG. 22, a snapshot of various views), manufactured from, but not limited to, Micrometals #26 powdered iron material or from any other similarly suitable material, manufactured by Micrometals, Inc. (Anaheim, Calif.). In FIG. 20, the front three pieces are identified as 2001, 2002, and 2003. In accordance with some embodiments of the instant invention, the total depth of the exemplary core is 6 inches.

In accordance with some embodiments of the instant invention, four set of three cores are used to facilitate manufacturing of the core pieces. In accordance with some embodiments of the instant invention, the individual core sets of three are banded with stainless steel bands. In FIG. 20, one of these four bands is identified as 2033. In accordance with some embodiments of the instant invention, the coils (2013, 2014, 2015) are constructed with 5 turns of 0.085"×3" copper foil with 0.005" Nomex layer insulation. In accordance with some embodiments of the instant invention, the copper foils are terminated with copper terminals (2027, 2028, 2029, 2030, 2031, and 2032). In accordance with some embodiments of the instant invention, since the core material has relatively low permeability of about 180, there are no added common mode gaps to reduce the common mode inductance. As used herein, the term of "high permeability" means a magnetic permeability that is at least 1000 times greater than the permeability of air, and the term of "low permeability" means a magnetic permeability that is less than 100 times the permeability of air.

In accordance with some embodiments of the instant invention, the differential mode gaps (2007, 2008, 2009) are constructed from fiberglass reinforced thermoset polyester dogbones or similarly suitable material and form three 0.50" thick differential mode gaps. In accordance with some embodiments of the instant invention, the mounting is constructed from two aluminum pieces (2017,2018)— mounting brackets. In accordance with some embodiments of the instant invention, the mounting brackets (2017,2018) are held in place against the cores with multiple screws and hardware, two of which are identified as (2016, 2019). In accordance with some embodiments of the instant invention, there are two steel lifting brackets (2034, 2035) that are held in place by three screws (2036, 2037, 2038) and associated nuts and washers.

Illustrative Inventive Sinewave Filters with Integrated Common Mode and Differential Mode Filtering In accordance with some embodiments of the instant invention, the inventive devices, such as filters, can modify an input electrical waveform generated by at least one source of electrical power provided on a first conductor. In accordance with some embodiments of the instant invention, the inventive filters can include a first inductor that is designed to be capable of connecting to the first conductor. In accordance with some embodiments of the instant invention, the inventive filters can include a second inductor that is connected in series to the first inductor distal to the first conductor and a capacitor is connected in series with the second inductor distal to the first inductor. In accordance with some embodiments of the instant invention, a second conductor is connected between the first inductor and the second inductor, the second conductor capable of presenting an output waveform. In some embodiments, the inventive filters include an exemplary inventive core that is constructed in accordance with instant invention.

In some embodiments, a relative polarity between the first inductor and the second inductor is additive. In some embodiments, the input electrical waveform is a first electrical waveform and, where at least one source of electrical power produces a plurality of electrical waveforms, each being provided on one of a plurality of conductors, and further includes a plurality of devices, each having a first inductor capable of connecting to one of the plurality of conductors, a second inductor connected in series to the first inductor, a capacitor connected in series with the second inductor distal to the first inductor and a plurality of second conductors connected between the first inductor and the second inductor, the plurality of second conductors being capable of presenting a multi-phase output waveform.

In some embodiments, the at least one source of electrical power is an adjustable speed drive. In some embodiments, the at least one source of electrical power produces the input electrical waveform by pulse-width modulation. In some embodiments, the output waveform is supplied to an electric motor. In some embodiments, the exemplary inventive filter of the instant invention reduces harmonic currents otherwise present absent the second inductor.

In some embodiments, there can be a resistor that is interposed between and in series with the second inductor and the capacitor. In some embodiments, there can be a capacitor that is placed between the neutral of the phase capacitors to ground.

Figure 23:
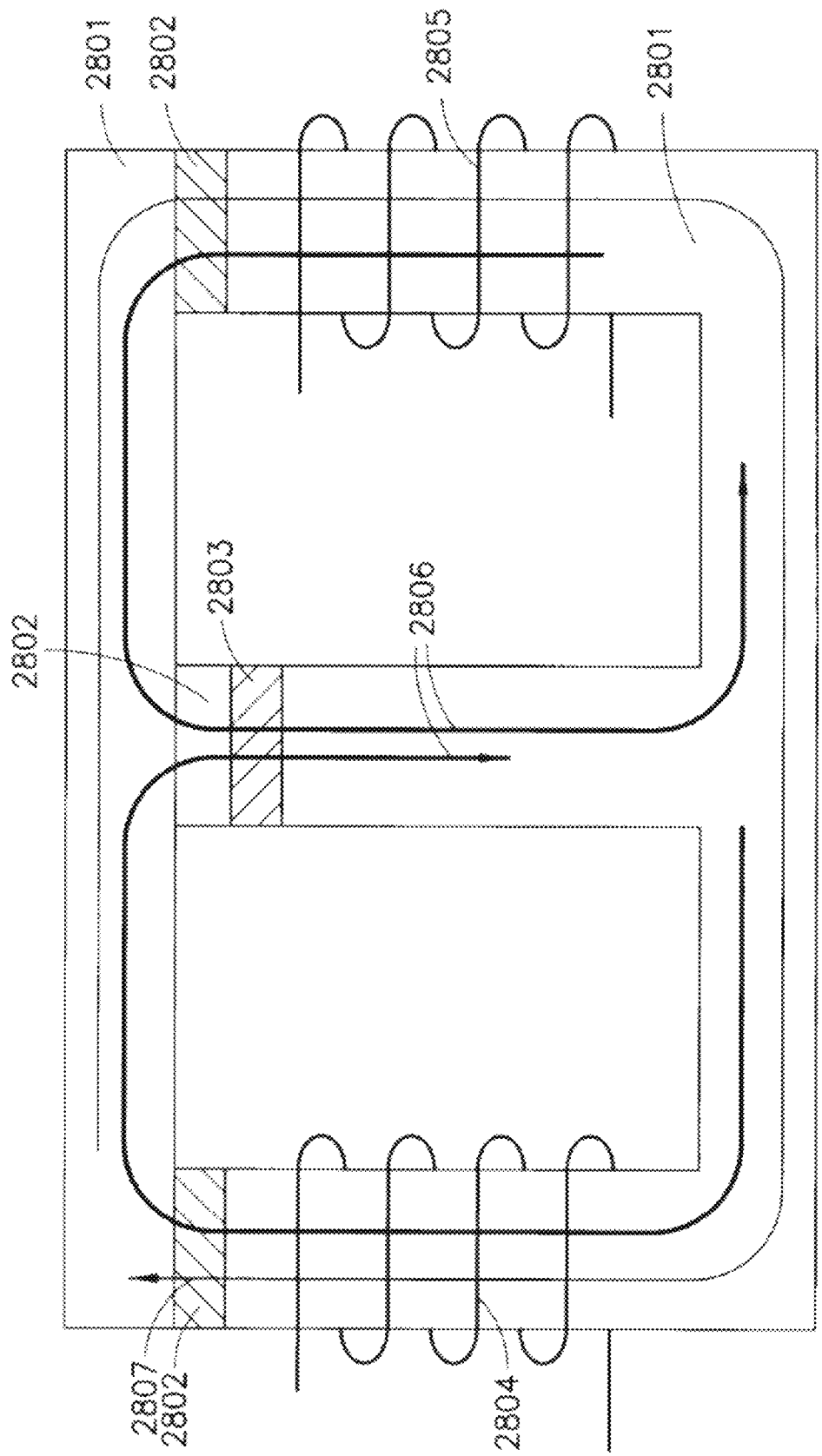

In some embodiments, the inventive inductors of the instant invention can perform as an adaptive passive inductor, having differential mode inductances, indicated by lines 2806, behave consistently as in an exemplary design of an integrated DC link choke shown in FIG. 23, and described in U.S. Pat. No. 8,692,644, hereby incorporated herein. For example, in FIG. 23, a core of the integrated DC link choke is made of laminations 2801. For example, the integrated DC link choke of FIG. 23 includes FAPs structure 2803 in the center. The term "FAPs" identifies the high permeability core gap pieces. In some embodiments, the FAPs can be made of composition(s) that contain ferrites. Ferrites are chemical compounds consisting of ceramic materials with iron(III) oxide (Fe2O3) as their principal component. Ferrites are usually ferrimagnetic ceramic compounds derived from iron oxides such as hematite (Fe2O3) or magnetite (Fe3O4) as well as oxides of other metals. In terms of their magnetic properties, the different ferrites are often classified as "soft" or "hard", which refers to their low or high magnetic coercivity. In some cases, the low coercivity typically means the material's magnetization can easily reverse direction without dissipating much energy (hysteresis losses), while the soft ferrite material's high resistivity prevents eddy currents. Typically, soft ferrite has a cubic crystalline structure with the chemical formula MO.Fe2O3 where Fe2O3 is iron oxide and MO refers to divalent metal (i.e.: zinc, nickel, manganese and copper) oxides in various amounts. The description of FAPs' behavior, use, and manufacture, as described in U.S. Pat. No. 8,692,644, can be utilized in the inventive devices and methods of the instant application as detailed herein.

For example, the ferrite material of FAPs structures can be made from any suitable soft ferrite material and/or alloy such as, but not limiting to, Nickel-Zinc ferrite material, Magnesium-Zinc ferrite material, Manganese-Zinc ferrite material, and any other materials exhibiting desired characteristics as utilized by the instant invention. In some embodiments, for FAPs structures, the instant invention can utilize, but is not limited to, one or more suitable materials sufficiently similar to soft ferrite materials produced by Fair-Rite Products Corp. such as Manganese zinc (Fair-Rite 31, 33, 73, 75, 76, 7, 78 and 79 material), Nickel zinc (Fair-Rite 42, 43, 44, 51, 52, 61, 67 and 68 material), Manganese (Fair-Rite 85 material), and Magnesium zinc (Fair-Rite 46 material). For example, FAPs possess a desired Curie temperature within a range of about 100 to 150 degrees Celsius. For example, FAPs possess a desired Curie temperature within a range of about 140 to 160 degrees Celsius. For example, FAPs possess a desired Curie temperature at about 250 degrees Celsius. For example, FAPs possess a desired Curie temperature at about 750 degrees Celsius. For example, FAPs possess a desired Curie temperature at about 1000 degrees Celsius. For example, FAPs possess a desired Curie temperature at about 1200 degrees Celsius or higher. For example, FAPs possess a desired Curie temperature at about 1200 degrees Celsius or lower.

For example, any suitable ferrite material can be used to achieve adaptive passive filtering of the instant invention. For example, Nickel-Zinc ferrite material can have a Curie temperature of about 140 degrees Celsius. Curie temperature is typically the temperature at which a ferromagnetic or a ferrimagnetic material typically becomes paramagnetic on heating; the effect is reversible. Typically, a magnet would lose its magnetism if heated above the Curie temperature. In one example, Nickel-Zinc ferrite material is typically used as complete cores on components operating at 1 MHz or more.

In some embodiments, the exemplary design of FIG. 23 further includes a gap piece 2802 of an insulation material like Nomex. In some embodiments, a common mode flux path, indicated by the arrow 2807, goes through the outside of the core. In some embodiments, since the differential mode flux path 2806 is through the center of the core where the FAPs 2803 are located, the differential mode inductance would increase at light loads and decrease to near rated inductance at full load. In some embodiments, a Curie temperature of FAPs in this case may not be required because the elevated differential mode inductance can be beneficial. In some embodiments, the increased differential mode inductance at reduced load can more effectively smooth the DC current on a DC bus. In some embodiments, the common-mode inductance can suppress common mode voltages in the motor drive. For example, the integrated DC link choke of FIG. 23 can be used for an adjustable speed drive.

In some embodiments of the present invention, the input electrical power is provided by the adjustable speed drive and the load is a motor.

In some embodiments, an exemplary inventive inductor of the instant invention is the passive adaptive type and further includes a resistor connected in series between the inductor and the capacitor.

In some embodiments, an exemplary inventive filter for filtering a three-phase electrical power waveform produces a three-phase output power waveform. In some embodiments, the exemplary inventive filter has an inductor having three sets of first and second coils, each having a capacitor connected in series therewith. In some embodiments, each of the capacitors are connected in common distal to the series connection with the second coil. In some embodiments, each of the three sets of first and second inductors having a tap intermediate the first and second inductors where the output waveform is present, each tap capable of being connected to a load.

In some embodiments, the exemplary inventive filter is passive adaptive and further includes a resistor connected in series between the inductor and the capacitor, the load being a three-phase electric motor.

Figure 24:
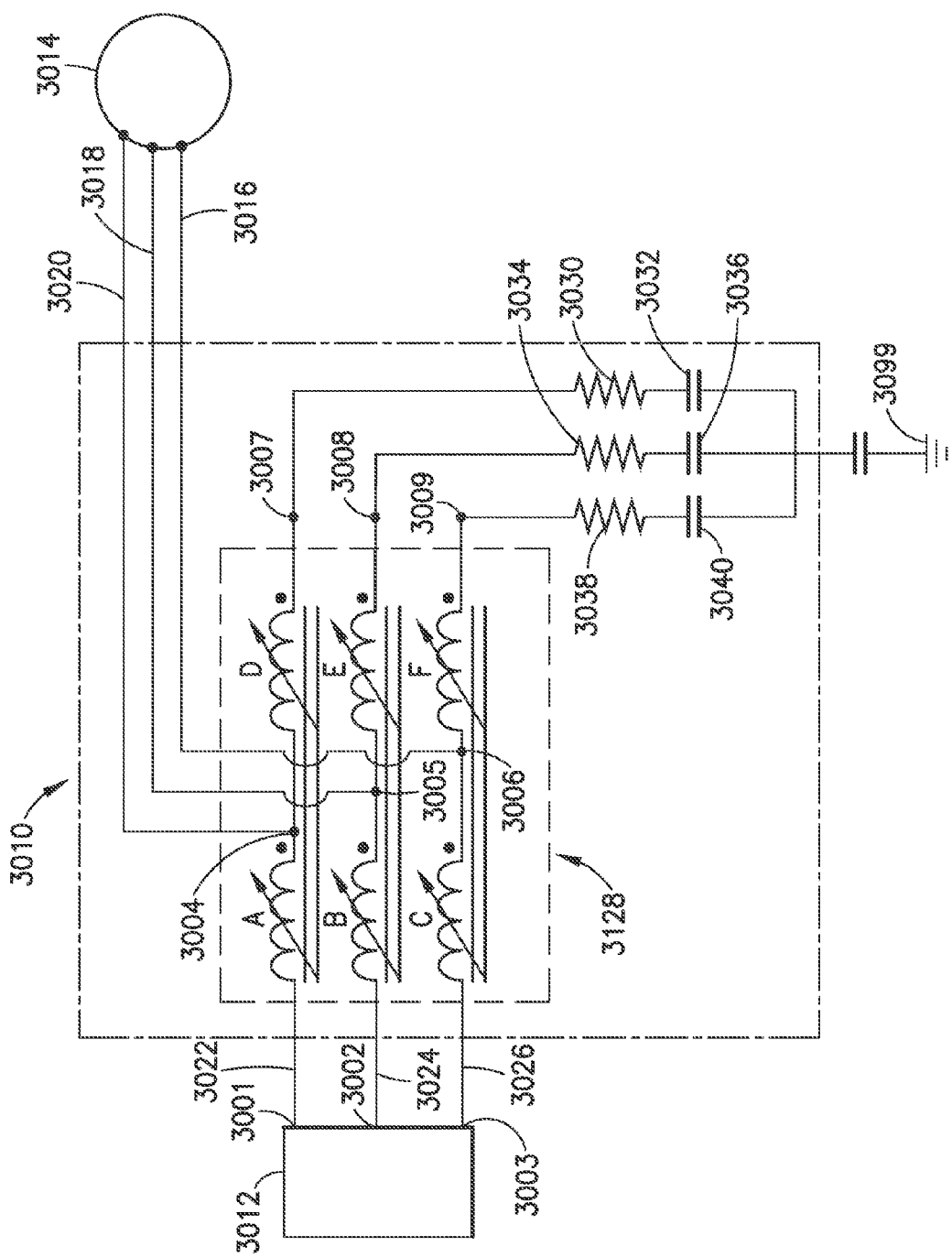

FIG. 24 is a circuit diagram of an exemplary inventive sinewave filter in accordance with some embodiments of the instant invention.

Figure 25:
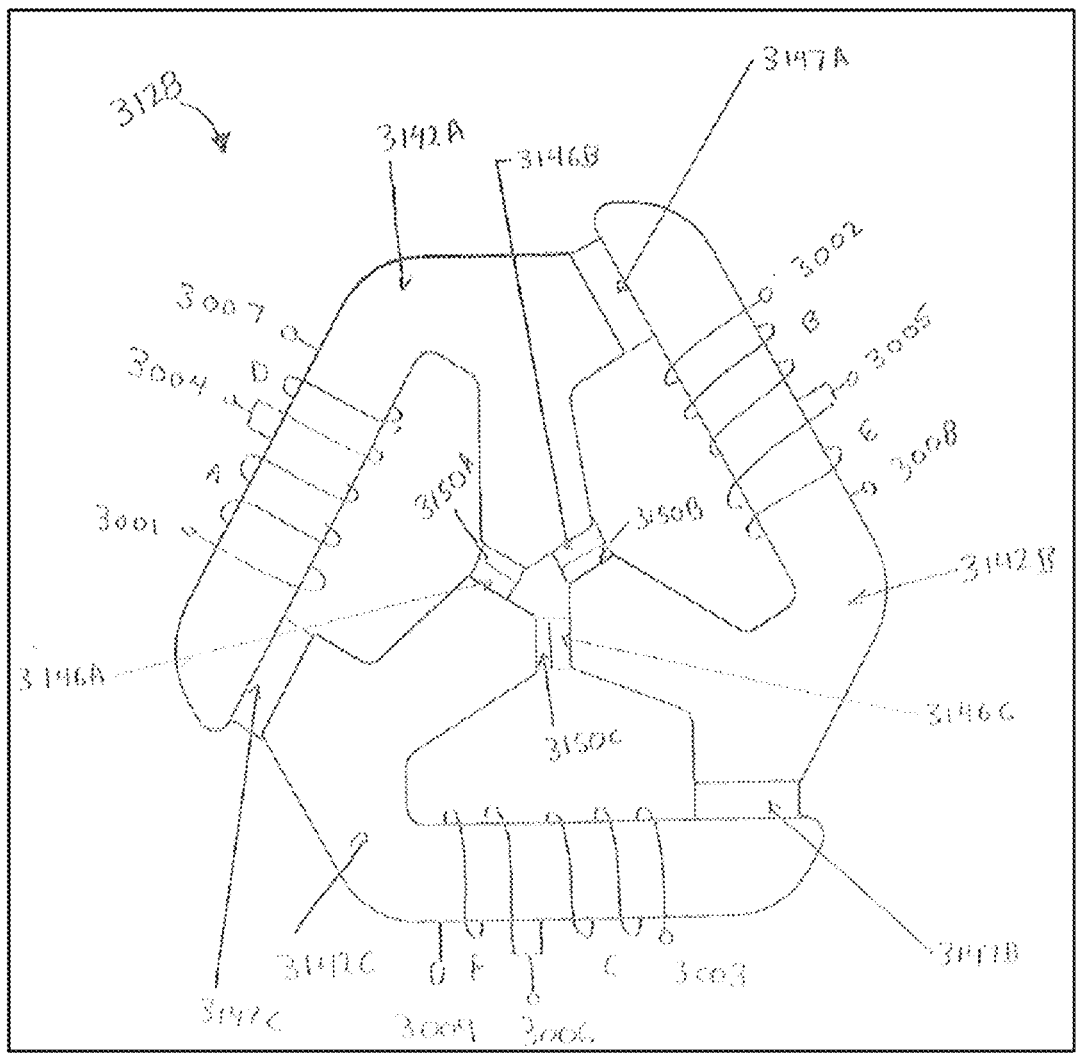

FIG. 25 is a schematic circuit diagram of an inductor that may be used with the exemplary inventive sinewave filter in accordance with some embodiments of the present invention.

Figure 26:
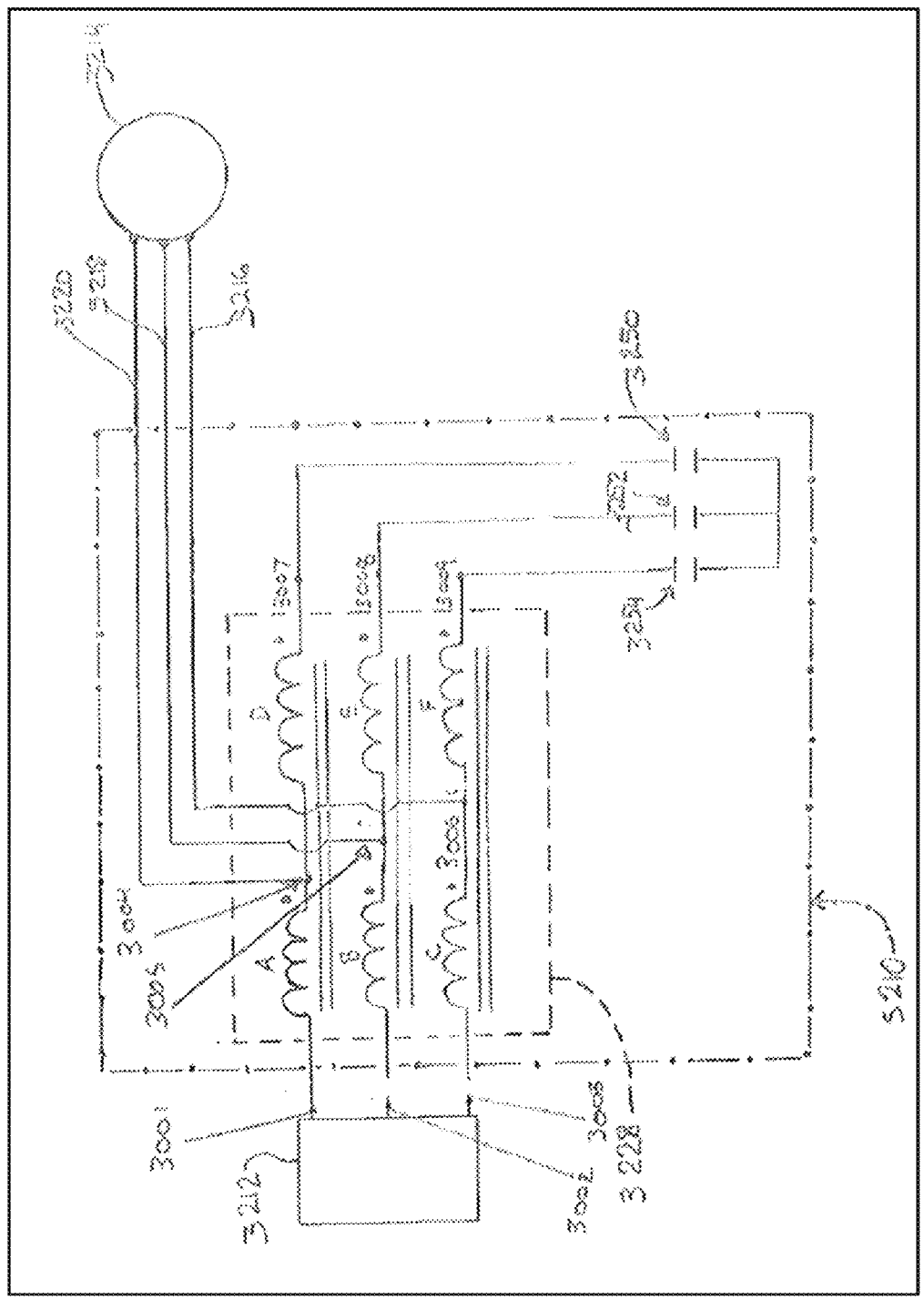

FIG. 26 is a circuit diagram of another exemplary inventive sinewave filter in accordance with some embodiments of the instant invention.

Figure 27:
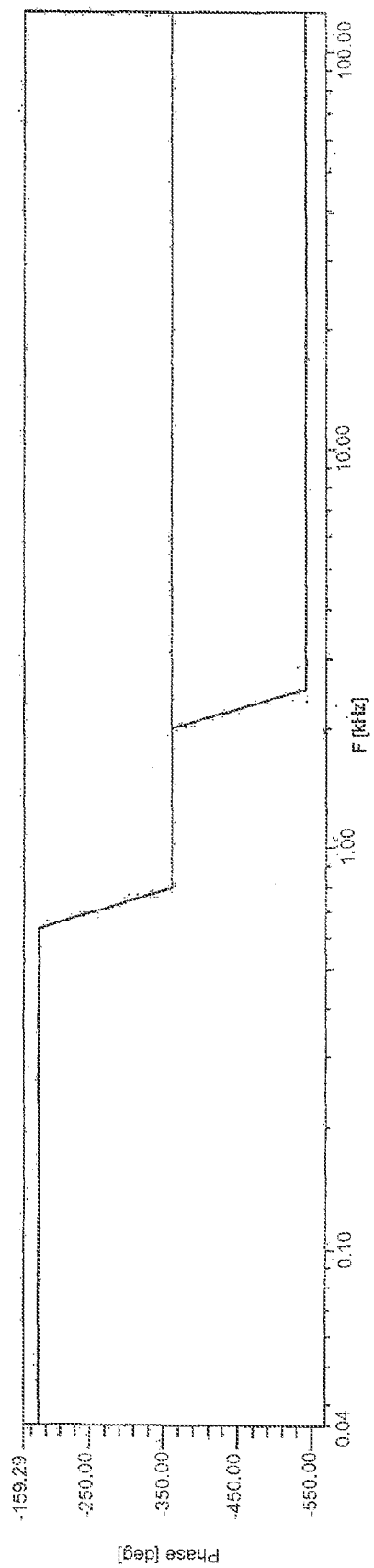

FIG. 27 is a graph of differential mode frequency response for an exemplary inventive sinewave filter in accordance with some embodiments of the instant invention.

In some embodiments, the inventive devices of the instant invention are designed to be utilized for drive output filters that provide a nearly sinusoidal output voltage when driven from variable frequency drives or other types of Pulse-width modulation (PWM) inverters with switching frequencies from 2 kHz to 20 kHz. In some embodiments, the inventive devices of the instant invention are utilized to eliminate and/or minimize, for example but not limited to, motor/cable insulation failures, heating, and/or audible noise. In some embodiments, the inventive devices of the instant invention are utilized to reduce electromagnetic interference (EMI) by eliminating or minimizing the high dV/dt associated with inverter output waveforms. In some embodiments, the inventive devices of the instant invention are design to improve cable protection and the economy of using standard grade electrical wire to improve protection against long lead drive-to-motor excess voltage.

FIG. 24 shows an exemplary inventive filter 3010 in accordance with some embodiments of the present invention which is interposed between an adjustable speed drive (ASD) 3012 and a motor 3014. For example, the ASD 3012 would receive electrical power from, e.g., a power grid or a generator (not shown). For example, the motor 3014 has a three phase input as indicated by lines 3016, 3018, 3020 and the ASD has a three phase output, as indicated by lines 3022, 3024, 3026. In some embodiments, the exemplary inventive inductor 3128 intermediates between the ASD 3012 and the motor 3014. In some embodiments, the exemplary inventive inductor 3128 is of the passive adaptive type, as shown in FIG. 25.

In some embodiments, an exemplary filter 3010 may permit reducing inductor size by combining the differential mode inductor I and the common mode inductor J, while avoiding or minimizing winding losses, harmonic currents, waste heat, mechanical vibration, proximity effects, gap heating, skin effect, etc. In some embodiments, the instant invention allows to reduce a size of the inventive inductor 3128 based, in part, on an arrangement of the coils A, B, C, D, E, F and/or the connections of the motor lines 3016, 3018, 3020 to tap terminals 3004, 3005, 3006 intermediate windings A and D, B and E and C and F, respectively. In some embodiments, an exemplary inventive inductor 3128 is coupled to the ASD at terminals 3001, 3002 and 3003 and has a plurality of windings A, B, C, D, E, F, each of which have a variable inductance attributable to the inductor 3128 being of a passive adaptive type. In some embodiments, terminals 3007, 3008, 3009 at the end of windings D, E, and F, respectively, connect to resister-capacitor couples 3030 and 3032, 3034 and 3036 and 3038 and 3040, respectively. In some embodiments, the capacitor 3099 is connected from the neutral of 3040, 3036, 3032 to control the capacitance to ground in the common mode filtering characteristic.

In some embodiments, the polarity of windings A, B, C with respect to D, E, F are shown by a dot. For example, FIG. 25 shows an inventive inductor 3128 that may be utilized in filter 3010 of FIG. 24. In some embodiments, the inventive inductor 3128 has a core having a hexagonal shape. In some embodiments, the windings A and D, B and E and C and F are disposed around three outer segments of 3142A, 3142B and 3142C of the hexagonal shape, respectively. In some embodiments, the terminals 3001-3009 referenced in FIG. 24 are also shown in FIG. 25. In some embodiments, high permeability core gap pieces, "FAPs," 3146A, 3146B, 3146C, and insulator gaps 3150A, 315B, 3150C, suitably similar to, but not limited to, the ones described in U.S. Pat. No. 8,692,644, entitled "Harmonic Mitigation Devices and Applications Thereof," to Shudarek et al., which is incorporated by reference herein for such specific purpose, can be interposed between each of the core pieces 3142A, 3142B, and 3142C. In some embodiments, FAPs can have an effect of providing adaptive passive inductance as indicated by the arrow symbols on the coils A, B, C, D, E, F in FIG. 24. In some embodiments, when an exemplary inventive inductor, like the exemplary inductor 3128 of FIG. 25, is used in the inventive filter 3010 of FIG. 24, windings A, B and C are coupled to windings D, E and F with the polarities indicated in FIG. 24 to increase the inductance tuned with the capacitor. In some embodiments, the capacitors 3032, 3036, 3040 in FIG. 24 only need to be rated for a reduced current. In some embodiments, the D, E and F windings only need to be rated for the capacitor current opposed to the A, B and C windings which have to be rated for the full motor current. In some embodiments, the D, E and F windings add relatively minor cost and size (e.g., less than 25%) to the filter 3010. In some embodiments, the voltage insertion loss of the filter 3010 is also reduced since only windings A, B and C are in series with the motor 3014 and not with the windings D, E and F. While the exemplary inventive inductor 3128 of FIG. 25 shows a variable inductance by coils A, B, C, D, E, F, attributable to the use of FAPs, an inductor made without FAPs, such as described in U.S. Pat. No. 8,692,644 may be used for some applications. In some embodiments, the exemplary inventive inductor 3128 can have a configuration other than a configuration as described above relative to FIG. 25. For example, an exemplary inventive inductors can have multiple gaps per in a section.

In some embodiments, the filter 3010 of FIG. 24 can utilize, for example but not limited to, resistors 3030, 3034, 3038 to reduce inrush (damping) when the filter 3010 is first energized to reduce ringing near the resonant frequency of the filter 3010 during operation. In some embodiments, for some applications, the filter 3010 can be utilized without additional damping. For example, FIG. 26 shows an exemplary inventive filter 3210 in accordance with some embodiments of the present invention without damping resistors, like 3030, 3034, and 3038, or the adaptive passive inductor 3128 utilized in some embodiments in accordance with FIG. 24.

In some embodiments, an exemplary inventive inductor 3228 of FIG. 26 is similar to the one shown in FIGS. 24 and 25 but without the FAPs. In some embodiments, the exemplary inventive inductor 3228 of FIG. 26 has an arrangement of the coils A, B, C, D, E, F and the connections of the motor lines 3216, 3218, 3220 to tap terminals 3004, 3005, 3006 intermediate windings A and D, B and E and C and F, respectively, is the same as in FIGS. 24 and 25. In some embodiments, the exemplary inventive inductor 3228 of FIG. 26 is coupled to the ASD 3212 at terminals 3001, 3002 and 3003. In some embodiments, each individual coil, D, E, and F, displays self-inductance and additional, mutual inductances from the other five coils and can each be tuned with the capacitors 3250, 3252, 3254, respectively, to the switching frequency of the ASD drive 3212.

FIG. 27 shows a frequency response of the inventive filter 3210 shown in FIG. 26, exhibiting an optimal attenuation at a specific frequency (for example, 2 kHz).

Illustrative Inventive Filters for Mitigating Harmonic Currents in Electrical Power Distribution Systems In some embodiments, the inventive devices of the instant invention are utilized in electrical power distribution systems, for example but not limited to, as filters for mitigating harmonic currents in such systems.

In some embodiments, an exemplary inventive filter of the instant invention can include a first, a second, and a third power source connectors, each to be utilized for connection to a different phase line from a three-phase power source. In some embodiments, a first load connector, a second load connector and a third load connector are provided for connection to a power consuming apparatus, such as a bidirectional power converter, for example. In some embodiments, a magnetic core is formed of magnetically permeable material. In some embodiments, a first phase filter can include a first line winding connected between the first power source connector and the first load connector and wound on the magnetic core in an orientation that produces magnetic flux having a first polarity. In some embodiments, a first shunt winding is wound on the magnetic core in an orientation that produces magnetic flux having a second polarity, opposite to the first polarity. In some embodiments, a first resistor and a first capacitor are connected in series with the first shunt winding and connected to ground.

In some embodiments, a second phase filter can include a second line winding connected between the second power source connector and the second load connector and is wound on the magnetic core in an orientation that produces magnetic flux having the first polarity. In some embodiments, a second shunt winding is wound on the magnetic core in an orientation that produces magnetic flux having the second polarity. In some embodiments, a second resistor and a second capacitor are connected in series with the second shunt winding and connected to ground.

In some embodiments, a third phase filter can have a third line winding connected between the third power source connector and the third load connector and is wound on the magnetic core in an orientation that produces magnetic flux having the first polarity. In some embodiments, a third shunt winding having one end wound on the magnetic core in an orientation that produces magnetic flux having the second polarity, a third resistor and a third capacitor connected in series with the third shunt winding between the third load connector and connected to ground.

In some embodiments, the line and shunt windings of each phase filter are magnetically coupled in a manner that lessens the total reactance between the power source connector and the load connector for the associated electrical phase line. In some embodiments, such coupling can provides a low impedance shunt path back to the load for high frequency harmonics in the regenerative mode of operation, while also providing suitably sufficient phase line impedance for harmonic currents from the power source in the motoring mode of operation.

In some embodiments, an exemplary core structure of the instant invention is designed in accordance with the principles of the instant invention and in a combination with principles of core construction detailed in U.S. Pat. No. 7,768,373 to Shudarek. In some embodiments, the exemplary core structure of the instant invention allows for precision tuning by being able to adjust the common mode and differential mode inductances independently. In some embodiments, the winding polarity on each phase of the exemplary devices of the instant invention enhances common mode filtering when combine with principles detailed in U.S. Pat. No. 7,378,754 to Shudarek regarding construction of a three-phase harmonic reduction filter for bidirectional power converters, which is hereby incorporated by reference herein for such specific purpose.

Figure 28:
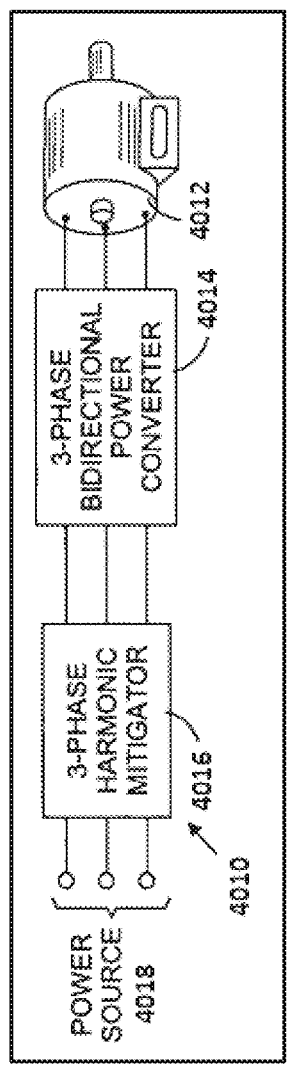

FIG. 28 is a block diagram of an exemplary harmonic mitigating filter in accordance with some embodiments of the instant invention, which is connected between electrical utility lines and a power converter that operates a motor.

Figure 29:
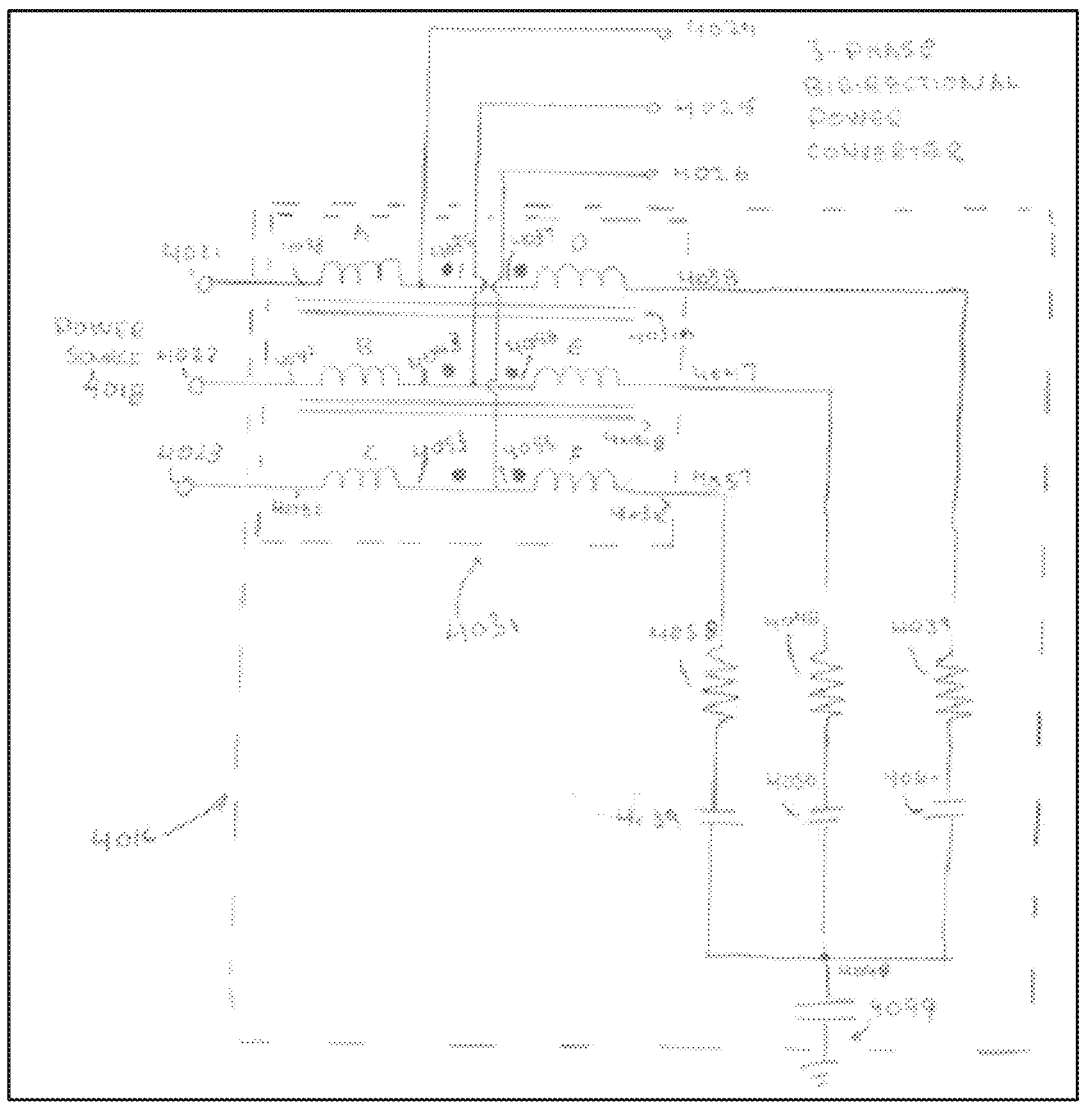

FIG. 29 is a schematic diagram of the exemplary harmonic mitigating filter in accordance with some embodiments of the instant invention.

Figure 30:
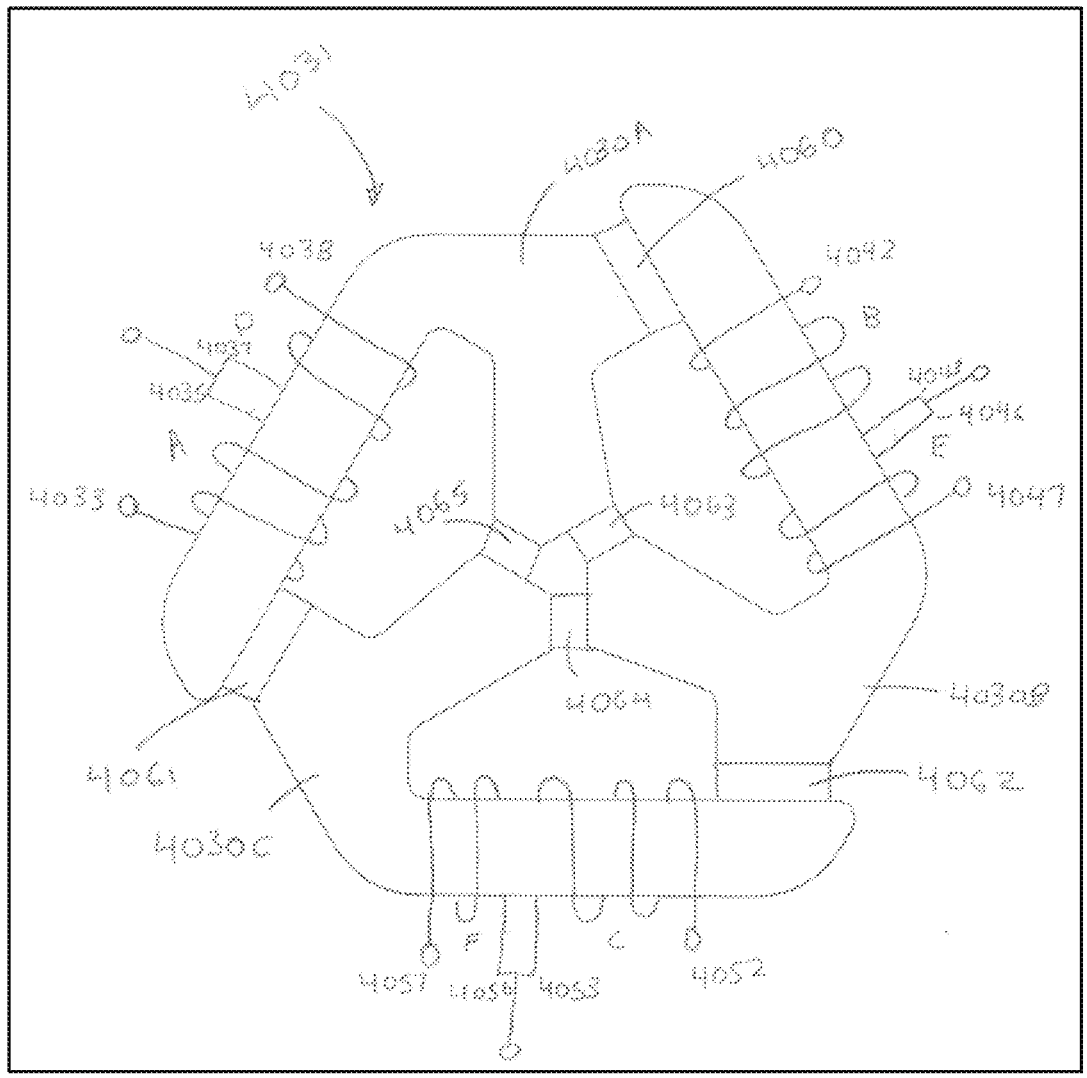

FIG. 30 illustrates an exemplary manner in which coils of the inventive harmonic mitigating filter are wound on a magnetic core in accordance with some embodiments of the instant invention.

As shown in FIG. 28, in some embodiments, a circuit 4010 for controlling application of electricity to a load, such as a three-phase motor 4012, can include a bidirectional power converter 4014. In some embodiments, an exemplary inventive three-phase filter 4016 is provided to mitigate harmonic currents that otherwise flow between the three phase lines of power source 4018 and the power converter 4014.

As shown in FIG. 29, in some embodiments, the exemplary inventive three-phase filter 4016 can have first, second and third power source connectors 4021, 4022 and 4023, respectively, to which the three lines of power source 4018 are connected. In some embodiments, the exemplary inventive three-phase filter 4016 can also have first, second and third load connectors 4024, 4025 and 4026 connected to the input terminals of the bidirectional power converter 4014. In some embodiments, the power source connectors and the load connectors can be terminals to which wires can be attached or the power source connectors and the load connectors can be electrical leads extending from electrical windings of an exemplary inventive filter constructed in accordance with some embodiments of the instant invention.

In some embodiments, the exemplary inventive three-phase filter 4016 is connected between a source connector 4021, 4022 or 4023 and the corresponding load connector 4024, 4025 or 4026, respectively. In some embodiments, the first phase of the exemplary inventive filter has a first line winding A wound on a core section 4030A of magnetically permeable material. In some embodiments, the first line winding A has a first end 4033 connected directly to the first source connector 4021 and a second end 4035 connected directly to the first load connector 4024. In some embodiments, the term "directly connected" as used herein means that the associated components are connected together by an electrical conductor without any intervening element, such as a resistor, capacitor, or inductor, which affects the transmission of current beyond the effects inherent in any electrical conductor. In some embodiments, the first line winding A is wound about the core structure 4030A in an orientation wherein the magnetic flux produced by that line winding has an instantaneous first polarity as designated by the dot at the second end 4035 of the winding. In some embodiments, a first shunt winding D has a third end 4037 connected to the second end 4035 of the first line winding A and is wound on the core 4030A in an orientation wherein the resultant magnetic flux has an instantaneous second polarity opposite to the first polarity as designated by the dot at the third end 4037 of the winding. In some embodiments, a first resistor 4039 and a first capacitor 4040, connected in series with another ground capacitor at end 4099. In some embodiments, the remaining end of ground capacitor 4099 is connected to system ground. In some embodiments, the resistor 4039 (1) improves the stability of the filter and (2) minimizes or prevents excessive current flow through the shunt branch.

In some embodiments, the second phase of the filter has a second line winding B wound on the core 4030B with a fifth end 4042, connected directly to the second source connector 4022, and a sixth end 4043, connected directly to the second load connector 4025. In some embodiments, the second line winding B is wound about the core 4030B in an orientation wherein the magnetic flux produced by that line winding has the first polarity. In some embodiments, a second shunt winding E has a seventh end 4046 connected to the sixth end 4043 of the second line winding 4041 and wound on the core 4030B in an orientation wherein the resultant magnetic flux has the second polarity. In some embodiments, a second resistor 4048 and a second capacitor 4050 are connected in series with ground capacitor at end 4099.

In some embodiments, the third phase of the filter has a third line winding C wound on the core 4030C with a ninth end 4052 connected directly to the third source connector 4023 and a tenth end 4053 connected directly to the third load connector 4026. In some embodiments, the third line winding C is wound about the core 4030C in an orientation wherein the magnetic flux produced by that line winding has the first polarity. In some embodiments, a third shunt winding F has an eleventh end 4056 connected to the tenth end 4053 of the third line winding C and is wound on the core 4030C so that the resultant magnetic flux has the second polarity. In some embodiments, a third resistor 4058 and a third capacitor 59, connected in series, with ground capacitor at end 4099.

Referring to FIG. 30, each combination of a line winding and a shunt winding for a phase is wound on a different core section 4030A, 4030B or 4030C of the magnetic core structure constructed in accordance with some embodiments of the instant invention. For example, the first line winding A and the first shunt winding D are wound in identical directions on the first core section 4030A, and the second line winding B and the second shunt winding E are wound in identical directions on the second leg 4030B. In some embodiments, the third line winding C and the third shunt winding F are wound in identical directions on the third leg 4030C. In some embodiments, the dimensions of the common mode non-magnetic gaps 4060, 4061, 4062 are set to adjust the tuning of the common mode filtering inductances of the exemplary inventive three-phase filter 4016. In some embodiments, the dimensions of 4063, 4064, 4065 are set to adjust the differential mode filtering inductances of the exemplary inventive three-phase filter 4016.

In some embodiments, the line and shunt windings on each leg are magnetically coupled in a manner that reduces the total reactance between the power source connector and the load connector for the associated electrical phase line. In some embodiments, such coupling provides a low impedance shunt path back to the load for high frequency harmonics in the regenerative mode of operation, while also providing sufficient phase line impedance (e.g., more than 10%) for harmonics coming from the power source in the motoring mode of operation. In some embodiments, the resonant frequency of the exemplary inventive three-phase filter 4016 can be selected based, at least in part, on the switching frequency of the bidirectional power converter 4014 and the frequencies of the harmonics produced by that converter in the motoring mode. In some embodiments, as a result of the line and shunt winding coupling, harmonic magnetic flux generated in the magnetic core structure 4030A, 4030B, 4030C by the a given line winding A, B or C has an opposite polarity to the harmonic magnetic flux produced by the associated shunt winding D, E or F, respectively, in both differential mode and common mode thereby resulting in at least a partial cancellation of the harmonic fluxes. In some embodiments, such cancellation precludes or minimizes at least a portion of the harmonic currents from flowing in either direction between the power source connectors 4021-4023 and the load connectors 4024-4026.

In some embodiments, the instant invention can provide an electrical system that at least includes the following: at least one three-phase inductor, having: at least one core, having: at least one first core segment, having a first shape; at least one second core segment, having a second shape; at least one third core segment, having a third shape; where the at least one first core segment, the at least one second core segment, and the at least one third core segment are configured to be: i) separate from each other and ii) adjustable relative to each other; a plurality of common mode gaps; where the plurality of common mode gaps are configured to separate the at least one first core segment, the at least one second core segment, and the at least one third core segment from each other; a plurality of differential mode gaps; where the plurality of differential mode gaps are configured to separate the at least one first core segment, the at least one second core segment, and the at least one third core segment from each other; where the at least one core is configured so that differential mode inductance flux paths during the operation of the at least one three-phase inductor depend on the first shape of the at least one first core segment, the second shape of the at least one second core segment, and the third shape of the at least one third core segment; where the at least one core is configured such that thickness of each common mode gap is capable of being independently adjusted from thicknesses of other common mode gaps of the plurality of common mode gaps to result in a particular common mode inductance; and where the at least one core is configured such that thickness of each differential mode gap is capable of being independently adjusted from: i) thicknesses of other differential mode gaps of the plurality of differential mode gaps and ii) the thicknesses of other common mode gaps of the plurality of common mode gaps, to result in a particular differential mode inductance.

In some embodiments, the first shape of the at least one first core segment, the second shape of the at least one second core segment, and the third shape of the at least one third core segment are the same.

In some embodiments, the particular common mode inductance is determined based on: i) core material from which the at least one core is made, ii) a size of the at least one core, iii) a number of coil turns, and iv) thicknesses of the plurality of common mode gaps.

In some embodiments, the particular differential mode inductance is determined based on: i) core material from which the at least one core is made, ii) a size of the at least one core, iii) a number of coil turns, and iv) thicknesses of at least one common mode gap and thicknesses of at least one differential mode gap being traversed by a differential mode inductance flux path associated with the particular differential mode inductance.

In some embodiments, the core material is selected from the group consisting of powered iron, molypermalloy, ferrite, steel laminations, and sendust.

In some embodiments, the thickness of each of the plurality of common mode gaps varies from 0.005 to 1.5 inches. In some embodiments, the thickness of each of the plurality of common mode gaps varies from 0.005 to 0.25 inches. In some embodiments, the thickness of each of the plurality of differential mode gaps varies from 0.005 to 1.5 inches. In some embodiments, the thickness of each of the plurality of differential mode gaps varies from 0.005 to 0.25 inches.

In some embodiments, the at least one core is configured such that a first longitudinal axis of a particular differential mode gap associated with a particular core segment is being positioned at an angle of 90 degrees to a second longitudinal axis of a particular common mode gap associated with the particular core segment.

In some embodiments, each of the plurality of common mode gaps is filed with at least one of: air, Nomex, a fiberglass-reinforced thermoset polyester, or any combination thereof. In some embodiments, each of the plurality of differential mode gaps is filed with at least one of: air, Nomex, a fiberglass-reinforced thermoset polyester, or any combination thereof. In some embodiments, the at least one first core segment, the at least one second core segment, and the at least one third core segment are held together in the at least one core by at least one flexible securing mechanism. In some embodiments, the at least one three-phase inductor further includes: at least one first coil bobbin being around the at least one first core segment, at least one second coil bobbin being around the at least one second core segment, at least one third coil bobbin being around the at least one third core segment; and where the at least one first coil bobbin, the at least one second coil bobbin, and the at least one third coil bobbin are configured to be independently manufactured from the at least one first core segment, the at least one second core segment, and the at least one third core segment, respectfully.

In some embodiments, the at least one three-phase inductor is a Root-Mean-Square current rating inductor. In some embodiments, the electrical system is a Sinewave filter. In some embodiments, the electrical system is a harmonic mitigating filter.

In some embodiments, the instant invention can provide an electrical system that at least includes the following: at least one three-phase inductor, having: at least one core, having: at least one first core segment, having a first shape; at least one second core segment, having a second shape; at least one third core segment, having a third shape; where the at least one first core segment, the at least one second core segment, and the at least one third core segment are configured to be: i) separate from each other and ii) adjustable relative to each other; and where the at least one core is configured so that differential mode inductance flux paths during the operation of the at least one three-phase inductor depend on the first shape of the at least one first core segment, the second shape of the at least one second core segment, and the third shape of the at least one third core segment.

While a number of embodiments of the present invention have been described, it is understood that these embodiments are illustrative only, and not restrictive, and that many modifications may become apparent to those of ordinary skill in the art.

What is claimed is:

1. An electrical system, comprising:
at least one three-phase inductor, comprising:
at least one core, comprising:
at least one first core segment, having a first shape;
at least one second core segment, having a second shape;
at least one third core segment, having a third shape;
wherein the at least one first core segment, the at least one second core segment, and the at least one third core segment are configured to be:
i) separate from each other and
ii) adjustable relative to each other;
a plurality of common mode gaps;
wherein the plurality of common mode gaps are configured to separate the at least one first core segment, the at least one second core segment, and the at least one third core segment from each other;
a plurality of differential mode gaps;
wherein the plurality of differential mode gaps are configured to separate the at least one first core segment, the at least one second core segment, and the at least one third core segment from each other;
wherein the at least one core is configured so that differential mode inductance flux paths during the operation of the at least one three-phase inductor depend on the first shape of the at least one first core segment, the second shape of the at least one second core segment, and the third shape of the at least one third core segment;
wherein the at least one core is configured such that thickness of each common mode gap is capable of being independently adjusted from thicknesses of other common mode gaps of the plurality of common mode gaps to result in a particular common mode inductance; and
wherein the at least one core is configured such that thickness of each differential mode gap is capable of being independently adjusted from:
i) thicknesses of other differential mode gaps of the plurality of differential mode gaps and
ii) the thicknesses of other common mode gaps of the plurality of common mode gaps,
to result in a particular differential mode inductance.

2. The electrical system of claim 1, wherein the first shape of the at least one first core segment, the second shape of the at least one second core segment, and the third shape of the at least one third core segment are the same.

3. The electrical system of claim 1, wherein the particular common mode inductance is determined based on:
i) core material from which the at least one core is made,
ii) a size of the at least one core,
iii) a number of coil turns, and
iv) thicknesses of the plurality of common mode gaps.

4. The electrical system of claim 3, wherein the core material is selected from the group consisting of powered iron, molypermalloy, ferrite, steel laminations, and sendust.

5. The electrical system of claim 1, wherein the particular differential mode inductance is determined based on:
i) core material from which the at least one core is made,
ii) a size of the at least one core,
iii) a number of coil turns, and
iv) thicknesses of at least one common mode gap and thicknesses of at least one differential mode gap being traversed by a differential mode inductance flux path associated with the particular differential mode inductance.

6. The electrical system of claim 5, wherein the core material is selected from the group consisting of powered iron, molypermalloy, ferrite, steel laminations, and sendust.

7. The electrical system of claim 1, wherein the thickness of each of the plurality of common mode gaps varies from 0.005 to 1.5 inches.

8. The electrical system of claim 7, wherein the thickness of each of the plurality of common mode gaps varies from 0.005 to 0.25 inches.

9. The electrical system of claim 1, wherein the thickness of each of the plurality of differential mode gaps varies from 0.005 to 1.5 inches.

10. The electrical system of claim 9, wherein the thickness of each of the plurality of differential mode gaps varies from 0.005 to 0.25 inches.

11. The electrical system of claim 1, wherein the at least one core is configured such that a first longitudinal axis of a particular differential mode gap associated with a particular core segment is being positioned at an angle of 90 degrees to a second longitudinal axis of a particular common mode gap associated with the particular core segment.

12. The electrical system of claim 1, wherein each of the plurality of common mode gaps is filed with at least one of: air, Nomex, a fiberglass-reinforced thermoset polyester, or any combination thereof.

13. The electrical system of claim 1, wherein each of the plurality of differential mode gaps is filed with at least one of: air, Nomex, a fiberglass-reinforced thermoset polyester, or any combination thereof.

14. The electrical system of claim 1, wherein the at least one first core segment, the at least one second core segment, and the at least one third core segment are held together in the at least one core by at least one flexible securing mechanism.

15. The electrical system of claim 1, wherein the at least one three-phase inductor further comprises:
at least one first coil bobbin being around the at least one first core segment,
at least one second coil bobbin being around the at least one second core segment,
at least one third coil bobbin being around the at least one third core segment; and
wherein the at least one first coil bobbin, the at least one second coil bobbin, and the at least one third coil bobbin are configured to be independently manufactured from the at least one first core segment, the at least one second core segment, and the at least one third core segment, respectfully.

16. The electrical system of claim 1, wherein the at least one three-phase inductor is a Root-Mean-Square current rating inductor.

17. The electrical system of claim 1, wherein the electrical system is a Sinewave filter.

18. The electrical system of claim 1, wherein the electrical system is a harmonic mitigating filter.

\* \* \* \* \*